United States Patent [19]

Issa et al.

[11] Patent Number: 5,783,989

[45] Date of Patent: Jul. 21, 1998

[54] ALARM SENSOR MULTIPLEXING

[76] Inventors: Darrell E. Issa, 1598 Parkview Dr.;
Jerry W. Birchfiled, 743 Imperial Dr.,
both of Vista, Calif. 92083

[21] Appl. No.: 396,115

[22] Filed: Feb. 28, 1995

Related U.S. Application Data

[63] Continuation-in-part of Ser. No. 945,667, Sep. 16, 1992, Pat. No. 5,534,845, and a continuation-in-part of Ser. No. 112, 940, Aug. 30, 1993, Pat. No. 5,532,670, and a continuation-in-part of Ser. No. 886,871, May 22, 1992, abandoned.

[51] Int. Cl.$^6$ .................................................. B60R 25/10
[52] U.S. Cl. .................. 340/426; 340/428; 340/511; 340/518; 340/521; 307/10.2; 180/287
[58] Field of Search .................. 340/426, 428, 340/429, 430, 825.63, 825.57, 825.06, 511, 517, 518, 521, 870.13, 870.19; 307/10.2, 10.3, 10.4, 10.5, 10.6; 180/287

[56] References Cited

U.S. PATENT DOCUMENTS

| | | | |
|---|---|---|---|
| 3,846,639 | 11/1974 | Ueda et al. | 340/459 |
| 4,077,030 | 2/1978 | Helava | 340/870.13 |
| 4,103,337 | 7/1978 | Whiteside | 340/870.13 |
| 4,111,058 | 9/1978 | Gross | 73/714 |
| 4,311,986 | 1/1982 | Yee | 340/825.03 |
| 4,383,242 | 5/1983 | Sassover et al. | 340/429 |
| 4,965,550 | 10/1990 | Wroblewski | 340/518 |
| 4,991,123 | 2/1991 | Casamassima | 340/825.08 |
| 5,272,476 | 12/1993 | McArthur et al. | 340/870.13 |
| 5,302,941 | 4/1994 | Berube | 340/518 |

*Primary Examiner*—Jeffery A. Hofsass
*Assistant Examiner*—Daniel J. Wu
*Attorney, Agent, or Firm*—Sam Talpalatsky, Esq.

[57] ABSTRACT

A security system for monitoring a protected area and sounding an alarm including a plurality of sensors arranged about a protected area for sensing incoming threat, device for generating at least one pulse for each sensor activated by the incoming threat to the area, an alarm controller for receipt of the pulses and sounding of an alert, and a single wire connecting outputs of the sensors to the controller for transmitting the pulses generated by the plurality of sensors to the controller.

24 Claims, 24 Drawing Sheets

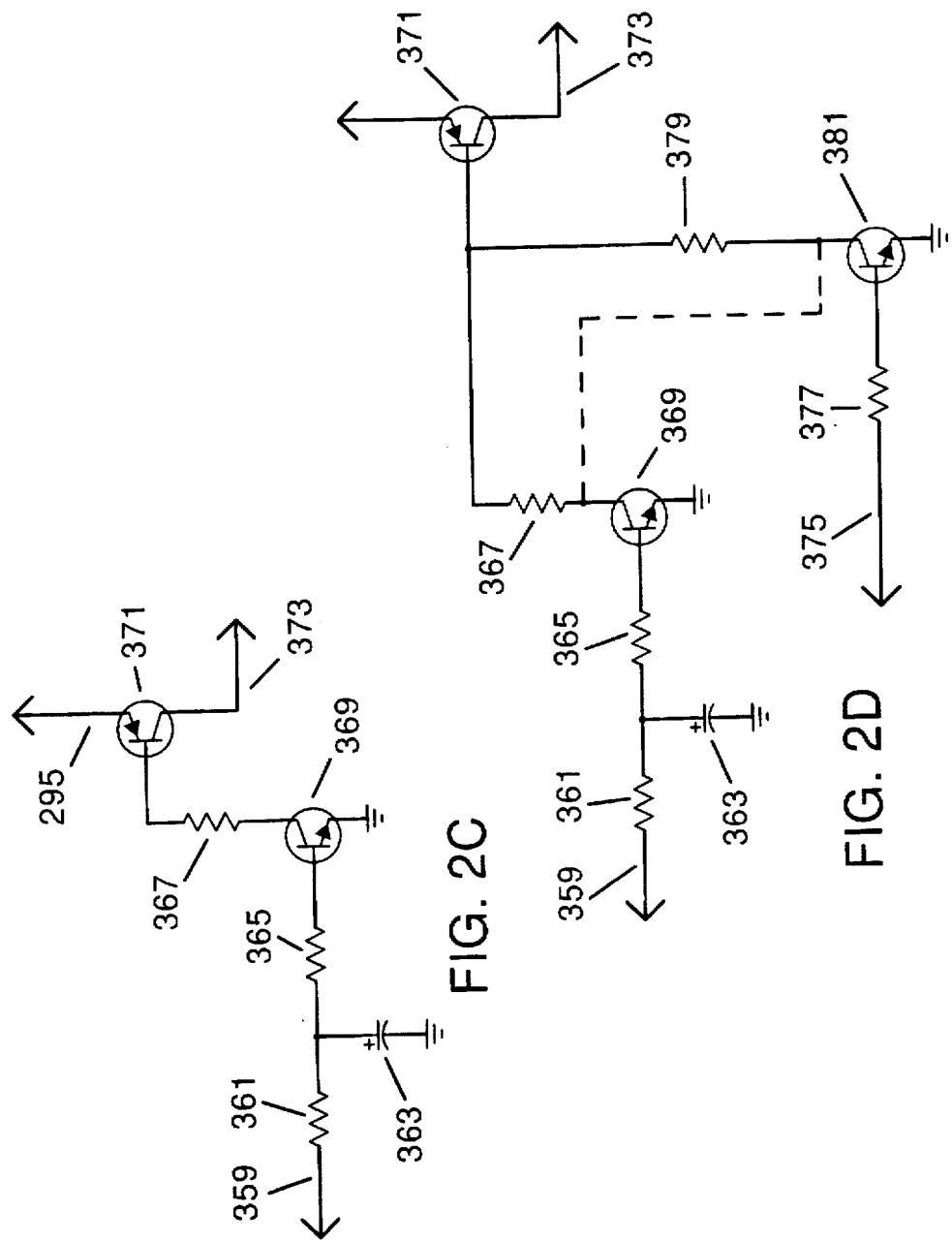

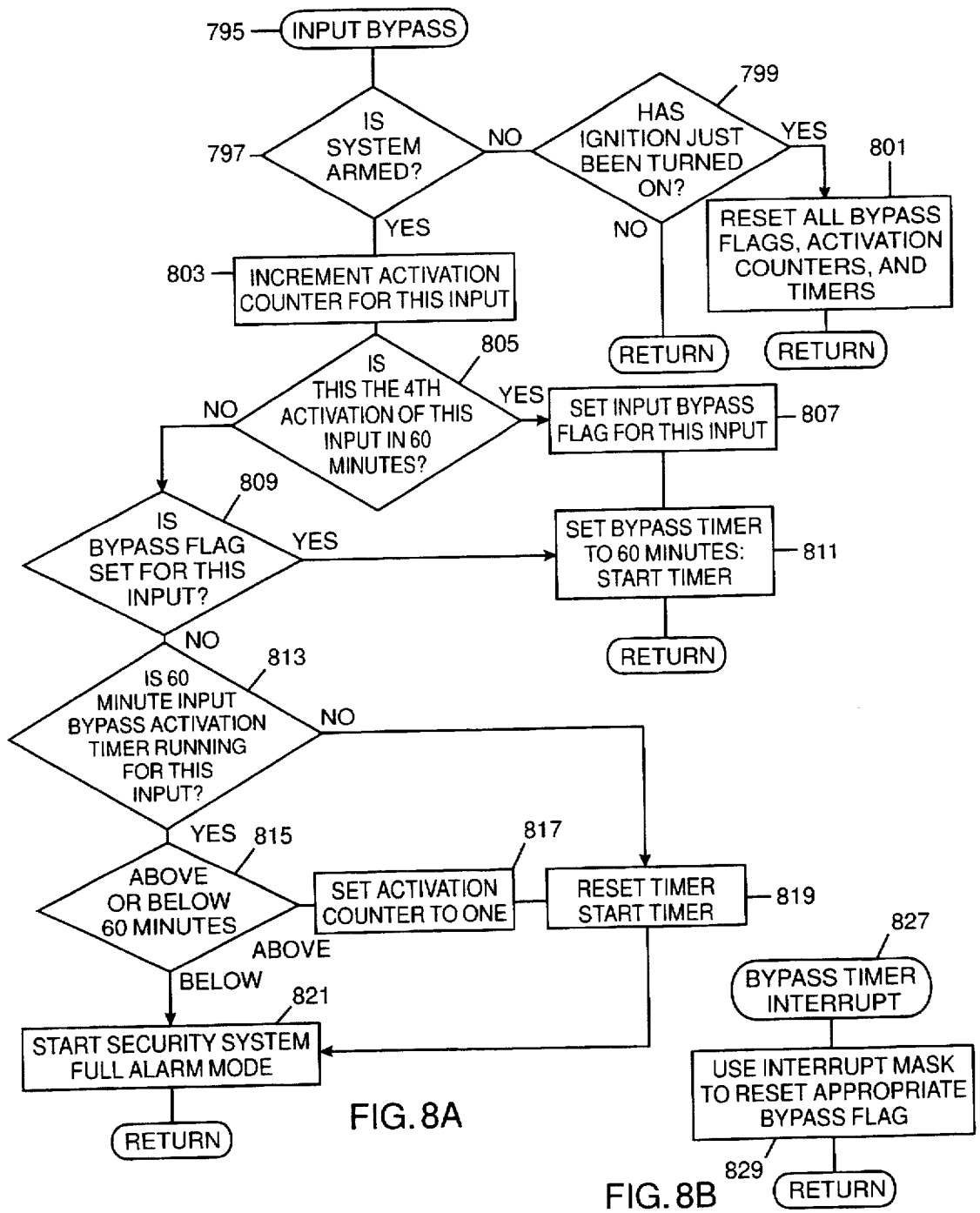

ALARM SENSOR MULTIPLEXING

This application for an "Alarm Sensor Multiplexing" (Ser. No. 08/396,115) is a continuation-in-part application of the U.S. patent application Ser. No. 07/945,667 dated Sep. 16, 1992 now U.S. Pat. No. 5,534,845; and a continuation-in-part application of the U.S. patent application Ser. No. 08/112,940 dated Aug. 30, 1993 now U.S. Pat. No. 5,532,670, and a continuation-in-part application of the U.S. patent application Ser. No. 07/886,871 dated May 22, 1992 now abandoned. The above are fully incorporated herein by reference.

BACKGROUND OF THE INVENTION

1. Field of the Invention

This invention relates to the field of security systems for monitoring restricted areas, such as in and around a vehicle, and provides more features, greater range of operator-system interface, and more user-friendly operation than those systems in the prior art. More particularly, this invention provides for multiplexing sensor output signals to a single wire for feeding and coupling to the alarm system.

2. Description of the Prior Art

Electronic security systems have been in use for many years monitoring or controlling access to secured or restricted areas. These security systems normally use several sensors or trigger devices for monitoring an area of restriction. A central controller monitors these devices and takes the appropriate action upon receipt of an input from one or more sensors. Examples of such security systems would include vehicle and home or business security systems. In today's art many of these security systems are controlled by a radio frequency pulse-width-modulated remote-control transmitter. The pulse-modulated radio frequency remote-control transmitter signal is digitally encoded to match the coding of the central controller's decoder, thereby restricting access of the security system to the allotted operators.

Security systems are no longer just security systems, but personal convenience systems as well. Vehicle security systems today offer the operator many new, advanced features that were not even considered a few years ago. Today the radio frequency remote-controlled vehicle security system provides remote door locking/unlocking, remote trunk release, remote window roll up/down, and remote vehicle starting, to mention a few of the newer features.

Most remote-controlled security systems today use both an audible and a visual arm/disarm notification signal to verify arming and disarming of the security system. On many occasions, this would be considered a nuisance because it could disturb people in an apartment complex, in a parking garage, or any residence when someone arrives late at night. Most vehicle security systems today have some method of permanently disabling siren chirps (audible notification signals), but this does not give the user the flexibility of choosing when to generate audible notification signals. A few security systems accomplish this by a radio frequency remote-control transmitter, but those lose something in the process. One such system delays the chirps (remote RF signal confirmation) until a second input on the control channel is received or not received (the arm/disarm notification is just delayed). Another uses a second remote channel to disable the chirps, but loses use of that channel for other purposes.

As of today no known security system uses a light sensor to control the vehicle's light systems. There are light sensor products for vehicles on the market, but none are built into a security system. Some use a light sensor to turn on lights, others turn on lights when the wipers are turned on, and some use a light sensor in vehicle convenience systems.

Most security systems with input diagnostic and bypass capabilities allow as many as 10 full alarm trips, triggered by one input, before disabling that input. If an alarm cycle is reset by the security system's remote-control transmitter, the input is re-enabled; and there is no timer to re-enable the input if the input stabilizes or the environment changes. With today's sensors and the high sensitivity at which the user wishes them to operate, it is not uncommon for a sensor to develop some periods of instability, particularly with changes in the environmental conditions. Most of today's security systems do not allow a sensor back into the system once it has been disabled until the security system is disarmed and rearmed.

In present-day security systems, a n"hidden" switch may be manipulated by the owner to turn off the security system and allow the remote-control transmitter to be used only to lock and unlock the doors. This is called the "valet" mode and is used for vehicle servicing, etc. Valet mode is a set condition of the security system in which the operator may have control of convenience features, but all alarm functions and outputs are disabled.

One of the convenience features of today's remote security systems is the capability to add a remote car starter. This allows operators in extreme cold climate areas to remote-start their vehicles to prevent engine block freezing, and to start their vehicles in the morning to warm the vehicle. During hot periods, operators may pre-cool their vehicles before they get in to drive. Usually when a vehicle is started by remote control, the security system must be disabled in some manner, otherwise the vibrations, voltage surges, and movement of the vehicle, would activate the alarm.

The programming of operational functions on most of today's security systems is accomplished through switches, jumpers, and input/output selection. This means the user or installer, if required, must access the control module to change any of the operational functions of the security system. This is a nuisance in that most times the control module is buried under the dash, under a seat, or behind a kick panel. This limitation of the user interface with the system is a major problem with today's security systems.

The testing of one of today's complex security system's installation can be a long and tedious task. The installer must check all the inputs to make sure that they are properly connected. He or she must also check all of the outputs to verify that they operate properly. They also must check that the security system has proper range for the RF remote-control transmitter. One existing system has a built-in test mode which is referred to as a "real time zone monitoring diagnostic mode" and a "RF performance mode". However, in these cases the installer requires assistance on the inside of the vehicle to monitor the LED or speaker. Other security systems have to be continually armed and disarmed while these tests are conducted. This is a tedious task, but it also could be damaging to the security system or vehicle since each time a security system is armed or disarmed the doors are locked or unlocked, the lights flash, and the siren chirps.

As stated in previous patents, one way an intruder gains access to a secured area is to remove and restore power to the security system, which on many older security systems will leave the security system inactive. Most of today's security systems will restore to full alarm mode when power is reapplied, unless a certain condition is preset before power is restored.

The audible chirps or synthesized voice signals of today's security system are quite loud in a low-noise environment, which can be a nuisance under many situations. These audible signals are always of the same intensity day or night, in a busy parking lot, in a hospital zone, etc. Some security systems have the capability to completely silence these audible signals, but none have the capability to reduce the volume of these audible signals within the control module.

Another drawback to the alarms of the prior art is the multiplicity of wires required for coupling of sensors to the alarm controller. It is customary to have at least one wire connecting a sensor and the alarm control system.

In prior art applications, a wire harness and/or pathway was a part of every design. By the time all the wires are routed to a single location, the wires encumber a significant space requirement contributing to the failure rate of the alarm system, added cost, and installation complexity. This invention provides for single wire reception of all sensor outputs wherein all the sensor outputs are multiplexed into a wire pair leading to the system controller.

The present device carries the capability of coding each sensor with a specific pulsewidth, thus allowing the controller to identify the source of alarm initiation and cataloging the occurrences of the same.

SUMMARY OF THE INVENTION

This invention is a automotive automation/vehicle security system that overcomes all of the problems described above. It provides more features, greater range of operator-system interface, more user-friendly operation than those systems in the prior art, a single line input to the system controller from a multiplicity of sensors, a method for coding and identifying each alarm signal from each sensor such that a history and a log of sensor activity may be maintained for troubleshooting the alarm system and/or identifying the vulnerability of the vehicle security.

The problem of the chirps creating a nuisance is overcome in the disclosed security system by a means for silencing the security system arm/disarm notification chirps from the system's remote-control transmitter. When the programmed channel 2 remote-control signal is confirmed, the controller starts a 5-second quiet period, during which, if a security system arm/disarm occurs, no audio notification signal output will be generated. Therefore the security system arm/disarm notification will be indicated entirely by the system's visual devices (running lights will flash and the status of the LED output will change).

The problem of a full alarm response being a nuisance is overcome by the security system providing multiple levels of sensor input, which in turn causes the controller to generate multiple levels of alarm output. With the lowest level of threat, the first level of sensor input will never cause the security system controller to generate a full audio and visual output. The maximum response to any activation of this input is several seconds of siren chirps or a synthesized voice message. The second level of input will always respond to the first activation of the second level input within any short period, such as 10-seconds, with the same output as the lowest level of threat input above, but any subsequent input within the 10-second window initiated by the first (second level) input will cause the controller to generate a full alarm response. This feature of the invention fully utilizes the capability of many of today's dual-level sensors. The third level input (the door input) is a two step input in that the first several seconds of alarm are siren chirps or synthesized voice message, after which will always follow the full siren alarm mode, unless the security system is disarmed by the user. The fourth level of input is the normal alarm instant input, which initiates a full alarm mode immediately upon being activated.

The security system of the invention introduces a new feature that increases the convenience of automotive automation/security systems. It uses a light-sensor input to allow the security system controller to control the vehicle's light systems. The Nite-Lite feature uses the light sensor to measure the level of light to control the light systems of the vehicle under various circumstances. The security system also controls the lights under other circumstances associated or not associated with the light sensor.

In daytime, the only lights that are turned on are the running lights, which are flashed during the full alarm mode and when the security system is armed or disarmed; with the exception that when the windshield wipers are turned on, they override the light-sensor control and turn on the headlights and the running lights for driving during rainy conditions. At night or under low light conditions; the headlights, running lights, and dome lights could be turned on; depending on the mode of operation. While driving, the headlights and running lights turn on automatically when the light level drops below the light-sensor lights-on-threshold, and off when the light level goes above the lights-off-threshold. When the security system is armed, the headlights and running lights turn on for 20 seconds. Upon disarm, the headlights and running lights turn on for 20 seconds, and the dome lights turn on for 60 seconds or until the ignition is turned on. During a full alarm mode, the headlights turn on and the running and dome lights flash. When the ignition is turned off, the lights go out for 5 seconds if on, then the headlights and running lights turn on for 20 seconds. If any lights are on when the ignition is turned on, they will turn off; five seconds later, the headlights and running lights will turn on for driving.

The problem with temporarily disabled sensors and the prior-art approach to remove them from the security loop is solved in this invention by the addition of circuitry that reanalyzes the unstable sensor at a later time and then, if the sensor is found to be stable, the sensor is returned to the system. If any prolonged sensor instability is detected, that sensor is bypassed for a stable period of one hour. If the sensor input in question activates the full alarm mode three times in one hour, that input is bypassed upon the next activation without entry into the full alarm mode. If the input stabilizes for a period of one hour, it is re-enabled. If the bypassed input is activated inside that one-hour window, the one-hour timer is reset to one hour and restarted. The only way the bypass flag can be reset is for the timer to expire or for the ignition to be turned on while the security system is disarmed. Even if the security system is reset while in the full alarm mode via the system's remote-control transmitter, the bypass counter would be incremented and if the count was then four, the bypass flag for this input would be set, bypassing the input in question.

Another problem solving feature of the invention includes means for placing the security system in "valet" mode or removing it from "valet" mode using the remote-control transmitter and one of the vehicle's doors. This is accomplished by opening a door of the secured vehicle and transmitting remote control signals from channel 1, then channel 2 within two seconds, and again channel 1 within two seconds. This toggles the valet mode; if valet is on, it is turned off, or if valet is off, it is turned on.

The problem of losing security and safety while remote starting a secured vehicle is solved by this invention. This invention allows the user to remote start the vehicle while at the same time continues to provide full security to the doors, trunk, hood and windows. Thus remote starting may be provided with effective security and safety being continued on the vehicle. If the security system is armed when the remote-control transmitter car-start signal is initiated, the security system will bypass some of the sensors before issuing the car start output signal. If the security system is disarmed when the remote-control transmitter car-start signal is initiated, the security system will lock the vehicle's doors before generating the car-start output signal, giving the user more security and safety. This feature requires a remote car-start control module for implementation of the remote car-starting and may be user-programmed to maintain security and safety when the car start output is generated.

A problem solving additional feature of the invention is the means for using the remote-control transmitter and valet switch to program system-operational functions. Once entered into the function programming mode, the user may depress the valet switch to select the function to be programmed, then toggle that function by using the remote-control transmitter. The security system will generate siren chirps to indicate the mode of the system operational function: one chirp to signify factory default and two chirps to signify an alternate mode. By depressing the valet switch, mounted on the dash, and transmitting with the remote-control transmitter, all system-programmable operational functions may be selected and programmed. This overcomes the need to access the control module to change system operational function programming, which in most cases with today's security systems would require the user return the vehicle to the dealer/installer.

The installer benefits most from the next feature of this invention because he or she will not require any assistance in testing the installation. The user also benefits in that the installation may be tested quickly and efficiently, reducing the cost of the installation. Means are provided for the security system to be tested using a highly advanced installation test mode. The security system-test mode is entered by generating certain inputs in a predetermined sequence. For instance, the user or installer may undertake a simple program, such as disarm the security system, press and hold the dash mounted valet switch, turn on the ignition, turn off the ignition, release the valet switch, then press and release the valet switch once more to enter the "test" mode. The disclosed security system will respond with one long chirp to indicate it has entered the test mode. While in the test mode, the user may test any of the operational inputs. The security system will respond with a siren chirp when the input goes active, and another siren chirp when the input goes inactive. At the same time, the security system's light-emitting-diode will indicate the last two inputs activated. By using the remote-control transmitter's channel 1, the user may select one input to test, which will disable all the other inputs. The user can step through all the inputs in this mode by pressing the remote-control transmitter as many times as the zone of the input to be tested. One of the most important features of the security system test mode is the remote-control transmitter range test.

System radio frequency remote-control transmitter range is a major problem with some installations due to interference from inside the vehicle or the placement of the control module, which contains the RF receiver. The RF range test is accomplished by transmitting a control signal on any remote channel other than channel 1. As long as one of these auxiliary remote-control transmitter inputs is active, the security system will respond by generating a siren chirp once a second. This allows the user to test the range of the system by walking away from and around the vehicle while pressing one of the remote-control transmitter buttons.

A problem solving feature of this invention is the restoration of the security system's operational mode after a power failure. At power-down, all pertinent data is stored in permanent memory. At power-up, this data is restored to the system's random access memory and registers before the system's program is restarted. This feature allows the security system to be restored to the exact same conditions that existed at power-down. If the security system was in the armed mode at power-down, it will return to the armed mode when power is restored.

A nuisance reducing feature of this invention is to lower the output volume of the siren chirps by varying the duty cycle of the siren power supply during the chirps. This invention also includes two means by which the security system can reduce the output voltage/power at the siren output to generate lower volume chirps. The volume of the output chirps may be fixed in the security system at a certain power duty cycle, controlled by security system program switches, or remotely controlled/selected with the system remote-control transmitter. In this way, the invention is extremely useful in and around hospitals and in other areas requiring the arm/disarm messages to be issued quietly. The user has the ability to change the decibel level of the audible arm/disarm notification outputs as well as to turn them off, using the hand-held remote-control transmitter.

Reliability enhancement feature of this invention provides for a reduced number of wires and hardware necessary for uncompromised operation of the alarm. Instead of employing a wire to couple each sensor output to the alarm controller, only a single wire is required to employ one sensor to "n" sensors. This is accomplished by coupling all the sensor outputs to a single, common output and connecting this common output to the controller input with a single wire/electrical path to transmit pulses generated by one or more sensors. This technique will be referred hereafter as multiplexing.

To provide for a history of sensor activity, the alarm system provides for storing of sensor activity, wherein the alarm controller receives the pulse from a sensor, identifies the sensor sensing an intrusion by the pulsewidth thereof, and stores/catalogs the sensor identification and operation into a history file for subsequent retrieval by a user or operator.

Accordingly, the main object of this invention is a vehicle security system that provides the user with a better interface to the system, allowing him or her to select a wide variety of unique features not easily accessible in existing security systems. Other objects of the invention include a vehicle security system that allows the user to turn off the audible arm/disarm notifications by using the hand-held remote-control transmitter; a security system with several levels of sensor inputs that cause the controller to generate several levels of alarm output; a security system with a light sensor input and other inputs to control the vehicle light systems; a security system that provides means for re-analyzing an unstable sensor to determine if it's stability has returned and return it to the security system if it has; a security system where the user may enter and exit the valet mode using the remote-control transmitter and one of the vehicle doors; a security system that provides a remote start output while maintaining maximum security and safety; a security system that allows the user to program system operational functions using the remote-control transmitter and the valet switch; a security system that allows the installer or user to test the system's operational inputs and the system's RF remote-control transmitter range with minimal effort; a security system that restores security to pre-power fail conditions when power is restored; a security system that has the means for generating variable volume arm/disarm notification chirps; a security system multiplexing all the sensor inputs into one signal wire regardless of the number of sensors employed; a security system encoding/assigning each sensor with a particular pulsewidth range; a security system having the ability to identify the sensor sensing intrusion by the pulse width of the sensor signal and storing/cataloging the same in a history file.

These and other objects of the invention may be found from a close reading of the Description of the Preferred Embodiment taken along with the drawings appended hereto. The scope of protection sought by the inventors may be gleaned from a fair reading of the claims that conclude this Specification.

DESCRIPTION OF THE DRAWINGS

FIGS. 2B and 2C are schematic diagrams of two alternate embodiments of the soft-chirp output feature;

FIGS. 8A and 8B are flow charts of the means for monitoring the input sensors of the security system, to bypass them after a prolonged period of instability and, after a given period of stability or when the ignition is turned on, while the security system is disarmed, readmit them to the system;

DESCRIPTION OF THE PREFERRED EMBODIMENT

Figure 1:
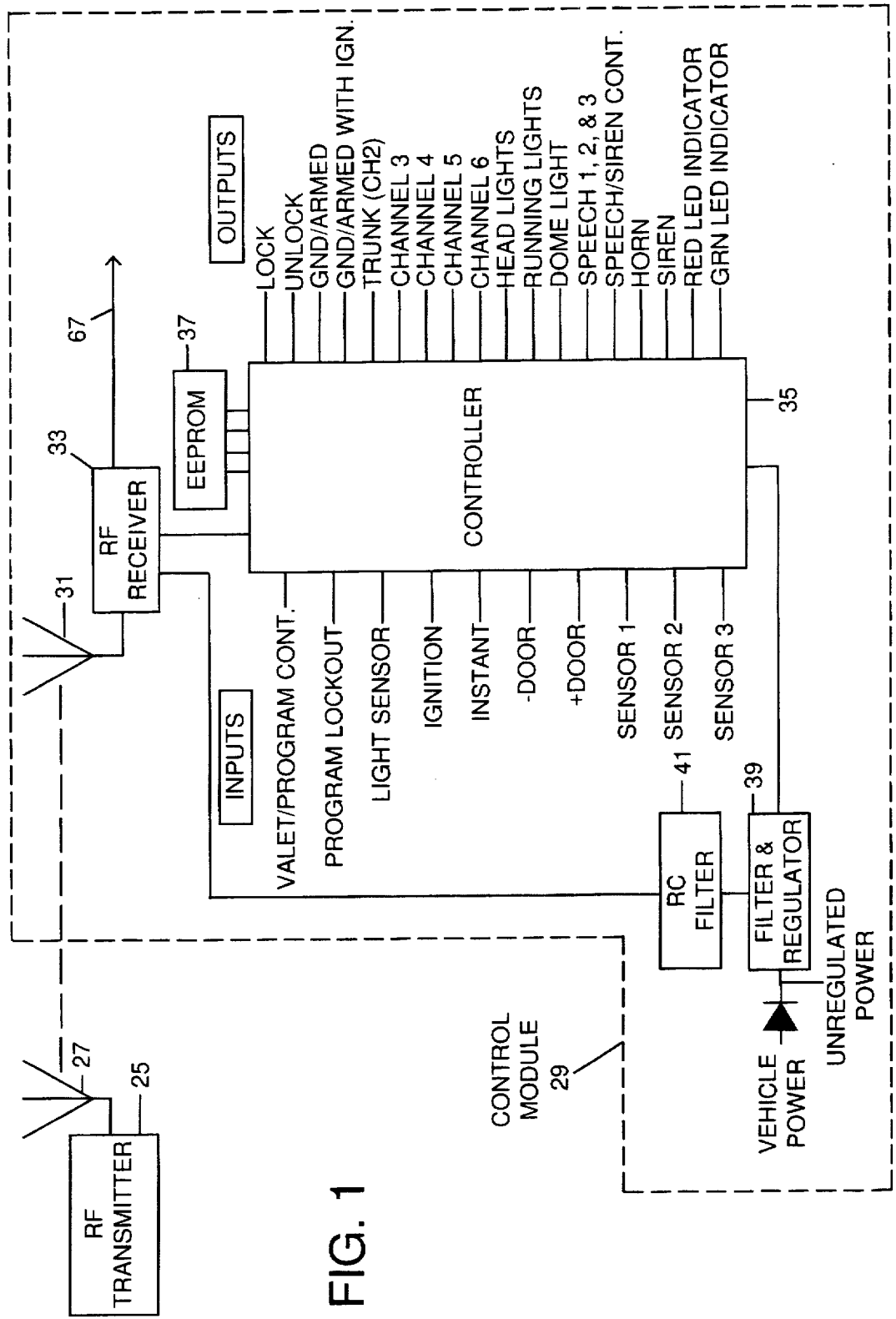
FIG. 1 is a simplified block diagram of a automotive automation/security system comprising this invention.

FIG. 1 represents a simplified block diagram of the primary functional components of the automotive automation/security system of this invention. This invention may be used in other areas and the description of its use in a vehicle should not be taken as limiting it in any way. The security system generally involves the interaction between a user and the system controller to obtain the various functions and features of the invention. This invention includes a radio-frequency (RF) remote-control transmitter 25 and a control module 29. Control module 29 includes a RF receiver 33, which receives a digital encoded signal transmitted via receiving antenna 31 from remote-control transmitter 25 via its antenna 27. Controller 35 and an external electrically programmable and erasable read-only memory EEPROM 37. The incoming digital signal code is either presented directly to controller 35, for decoding, or as an alternate means to a system integrated circuit decoder for decoding to give the proper channel output corresponding to the transmitted channel.

The user may employ a plurality of system hardware to generate inputs, generally shown along the left side of controller 35, for communicating commands to the controller. Such hardware may include program switches, jumpers, or jumper pins, valet switches, ignition switches, and door switches. Most commands are communicated to the controller during normal use of the vehicle, such as turning the ignition on or off and opening or closing the vehicle door. The remote-control transmitter 25, in the hands of the operator or user, can issue operational, operational function programming, and operational testing commands to controller 35. These commands include a stream of 29 binary bits of data that are assembled in a fixed sequence to form the particular user code for a given command. These codes are preset by programming either by the manufacturer, the installer or the user.

The vehicle battery supplies power to the control module 29. The vehicle provides a nominal 12.6 volts direct current (DC) power to all powered inputs to the control module. Power supply 39 filters and regulates the power to supply either 5 or 12 volts, as required, to components of the control module. The RF receiver 33 power is further isolated and filtered by an additional resistor and capacitor (RC) filter 41. The remote-control transmitter 25 is powered by either a 9-volt or 12-volt miniature alkaline battery.

Figure 4:
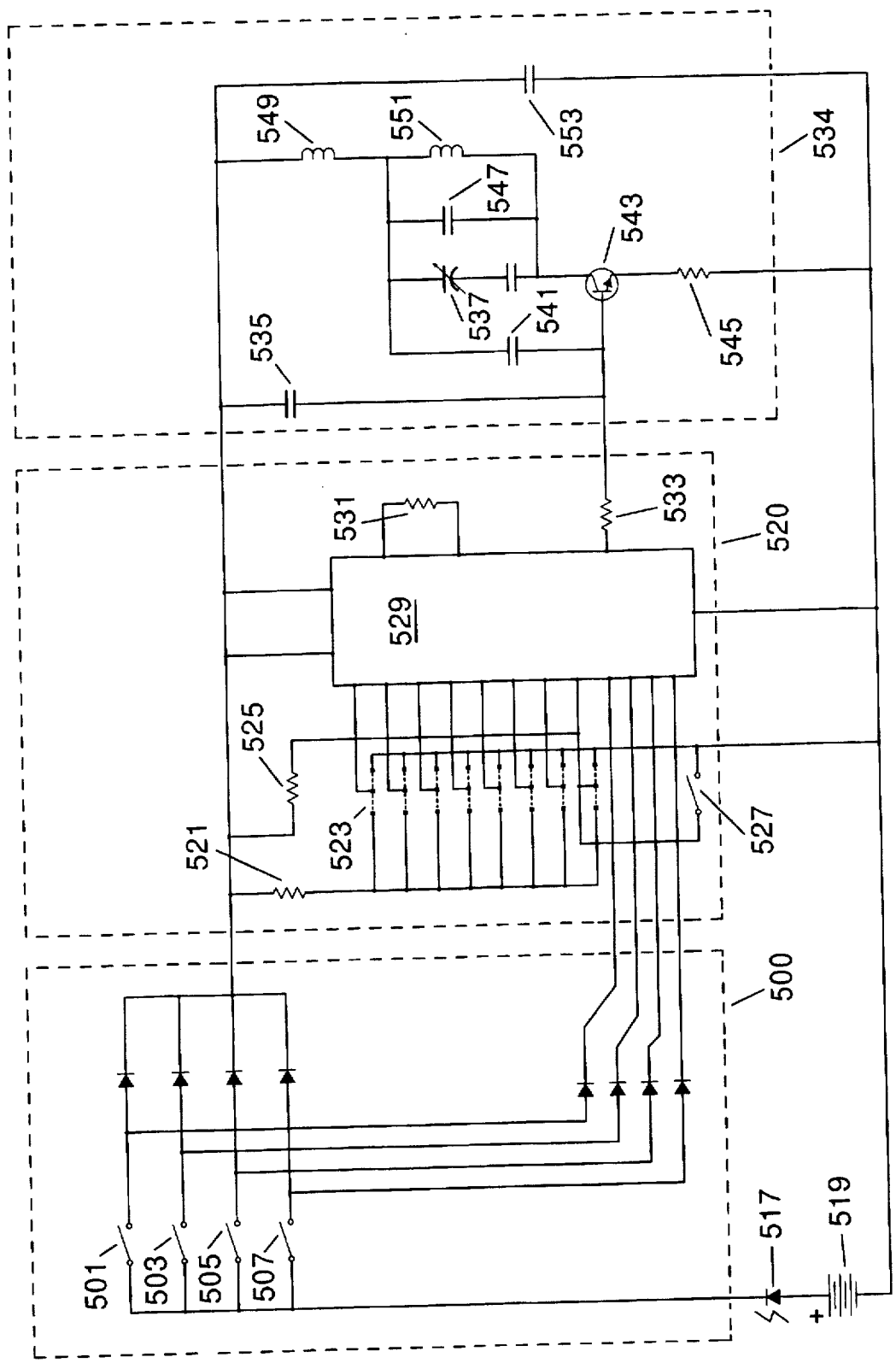
FIG. 4 is a schematic of the frequency remote-control transmitter depicted in FIG. 1.

Remote-control transmitter 25 as shown in FIGS. 1 and 4, in the most preferred form, provides a pulse-width-modulated radio frequency signal, wherein an RF carrier at some predetermined frequency is modulated (turned on and off by variable pulse widths) by pulses from an internal encoder-integrated circuit 529. Remote-control transmitter 25 is comprised of the channel selection section 500, the transmit indicating LED 517, the battery 519, the encoding section 520, and the RF transmitting section 534. As is well-known in the art, remote-control transmitter 25 is normally actuated by depressing one or more switches 501, 503, 505, or 507, located in the remote-control transmitter 25 casing, to generate a distinct RF signal encoded with the information from encoder integrated circuit 529.

Encoder 529 generates a 29-bit binary digital code; the pulse width of each pulse determines if the code bit is a zero or a one. The specific code of a particular remote-control transmitter 25 is determined by 12 trinary inputs controlled by cutting traces 523 and the remote-control transmitters switches 501-7. An optional resistor 525 and switch 527 allow the user to double the output channel capability of remote-control transmitter 25. LED 517 indicates when the remote-control transmitter 25 is active. Battery 519 supplies power through LED 517, channel selection section 500, to encoding section 520 and RF transmitting section 534. A resistor 521 protects the battery from a dead short if neither a positive nor a negative trace is cut on one of the encoder trinary-input coding pins. A clock-adjust resistor 531, coupled to encoder 529, controls the width of all output pulses.

An output drive resistor 533, coupled to encoder 529, passes drive current to the base of the remote-control transmitter's RF oscillator transistor 543. RF transmitting section 534 comprises a Colpitts oscillator that includes capacitors 535, 541, 537, and 547, a transistor 543, an emitter resistor 545 and inductors 549 and 551. Inductor 549 acts as a power supply decoupler while inductor 551 acts as the printed circuit board antenna loop. Said antenna loop is the source of the RF signal generated by remote-control transmitter 25. A capacitor 553 is provided as a power-supply RF de-coupling capacitor.

Figure 3:
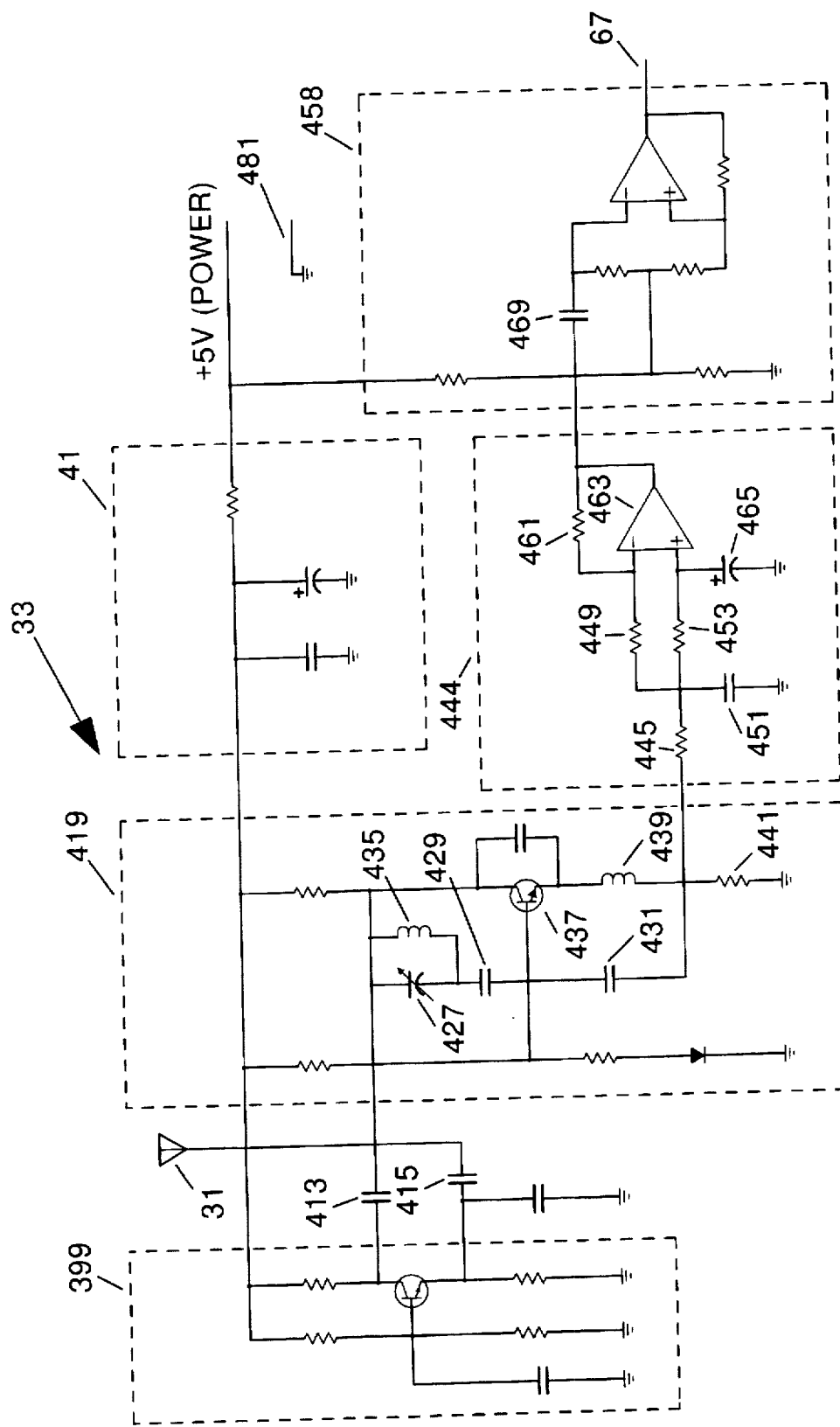
FIG. 3 is a schematic diagram of the radio-frequency receiver section of the control module depicted in FIG. 1.

Receiver 33, of the super-regenerative type, as shown in FIG. 3 includes a local RF oscillator 419, comprising a tuning capacitor 427 and an inductor 435 that are driven by a transistor 437. The encoded RF signal is received through antenna 31, which may be a length of wire approximately one-half wavelength long. It is then AC-coupled by capacitor 415 to the emitter of the common base amplifier 399. This common base amplifier acts as an impedance-matching circuit for the antenna input and as an RF de-coupling isolator for the local super-regenerative oscillator to minimize RF feedback into the antenna. Capacitor 413 couples the amplified RF signal from the input amplifier 399 to oscillator 419. Oscillator 419 actually includes two coupled oscillators; a low-frequency oscillator (capacitor 431 and inductor 439) that sweeps the high-frequency oscillator (capacitors 427 and inductor 435) over a wide range of frequencies via coupling capacitor 429. The low-frequency oscillator is referred to as a quenching oscillator and also the quenching signal is sometimes injected from an external oscillator. An on-frequency RF signal injected into the high-frequency oscillator through input capacitor 413 causes the oscillator to go into oscillation prematurely, causing a change in duty cycle of the low-frequency quenching oscillator. This duty-cycle shift is detected at emitter resistor 441 and DC-coupled through resistor 445 to an RF filter capacitor 451 located in an amplifier 444, which filters out the high frequencies of both local oscillators, leaving a digital pulse train identical to that generated by encoder 520 in remote-control transmitter 25 except for amplitude.

A resistor 453 and a capacitor 465 further filter the pulse train to provide automatic gain control (AGC) reference to an operational amplifier 463. An input resistor 449 and a feedback resistor 461 establish the gain of amplifier 463. The output of amplifier 463 is then AC-coupled via a capacitor 469 to an amplifier 458, which is set up as a Schmitt trigger, in that any signal at the input exceeding a predetermined reference level causes a rail-to-rail shift at output 67. The receiver output signal at output 67 is now ready for decoding to see if it is a valid control signal.

Figure 2A:
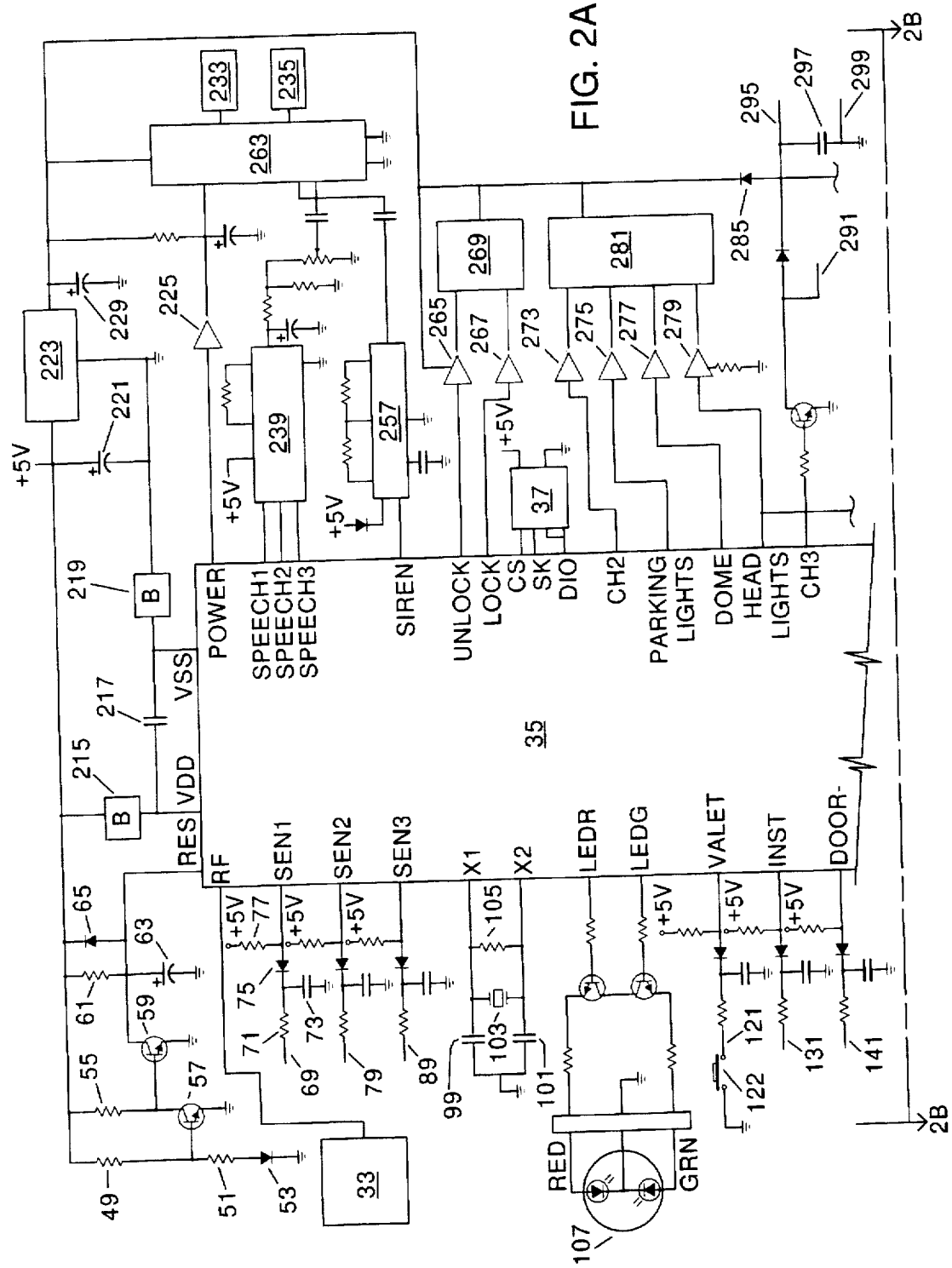
FIG. 2A is a schematic diagram of the control module of the security system depicted in FIG. 1, with the radio-frequency receiver shown on two sheets for clarity.

Output from receiver 33 is then fed to an RF input 67 of controller 35, as shown in FIG. 2A, for decoding to determine if the input is a valid control input. To establish validity, controller 35 must compare the input with the previously programmed remote-control transmitter 25 codes stored in EEPROM 37. Controller 35 in this case comprises a National Semiconductor COP880 microcontroller with read-only memory (ROM) and random access memory (RAM). If controller 35 receives a valid control signal, it responds to this signal by generating an output or outputs according to the control signal received, the operational mode of controller 35, and the status of the other inputs at the time the signal is received.

As shown in FIG. 2A, the security system inputs are indicated at 69, 121, 131, 141, 151, 171, 191, 193, 197 and 203, and each input is buffered by its own individual input buffer circuit. For example, for input 69 the buffer circuit comprises an isolation resistor 71, a filter, a capacitor 73, an isolation diode 75, and a pull-up resistor 77. Examples of these sensor elements are shock sensors; field-disturbance sensors (radar); door, hood, trunk, or ignition switches; audio discriminators (glass-break) sensors; and light sensors. In prior art alarms controllers, a sensor input is required for each sensor such as input 69. In the present invention, one to "n" sensors are connected to the same input. This provides for less wiring, improved reliability, reduction of weight and material and improved ease of troubleshooting. The specific features and arrangement of this inventive step, called multiplexing, is described in more detail below.

When the security system is armed, and at other times as required, the controller 35 sensor input 69 is continually monitored as to the status of the sensors or the change thereof. Depending on the application, it may be plausible to multiplex other inputs such as a hood, door, trunk, ignition and the like onto one wire. FIG. 2 of this application shows a multiplexing of sensors 1, 2 and 3, as an example, and individual input lines for other actuators such as the hood, door, light sensors, trunk, ignition, etc. Any combination of the methods may be employed and governed by the economics or the requirements of a particular application.

Some inputs are assigned to various zones for convenience in monitoring the specific areas of the vehicle such as sensors, doors, hood or trunk, etc. These inputs are buffered for voltage transients and surges depending upon the type of input. For example, positive triggered inputs are the positive door circuit FIG. 2A 171, the ignition input 151, and the light sensor input 197/203. The sensor inputs 69, 79, and 89, valet 121, instant (hood/trunk) 131, and negative door 141 are triggered by negative inputs. The valet input comes from depressing a dash-mounted valet switch 122. The wiper input 193 is programmable positive or negative by use of a jumper pin shorting connector at the input selection connector 349. The fact that all these inputs go independently directly to controller 35 allows it to monitor the status of each input separately, as well as to be able to independently disable unstable inputs, and allows for maximum security with the balance of the inputs when any one input becomes unstable and is disabled. This greatly enhances the capability of the advanced self-diagnostics to help maintain the maximum security possible when inputs become unstable.

The security system further includes multiple audio, visual, and electronic output transducers/devices. These are indicated in FIG. 2A at 107, 233, 235, 269, 281, 291, 305, 313, 321, 329, 337, and 345. Examples of these output devices are sirens (either electronic or mechanical) or synthesized voice outputs 233 and 235, lights (head, running, and dome) 281, door actuators (locking/unlocking motors) 269, hood lock 313, trunk-release solenoid 281, dash mounted LED 107 (red/green), starter disconnect 305, horn 345, a remote pager, an autodialer, window roll up/down motors or other control modules, such as remote car-start module, and other vehicle security system outputs. Any auxiliary output channel can be used to control other electrically controlled devices as required by the user.

As shown in FIG. 2A, all the outputs are generated by controller 35. The outputs are buffered by the different output devices, depending on the output in question. The power control output from controller 35 is buffered by a power invertor 225. It is used to minimize the standby power drain of output power amplifier 263. This power amplifier 263 is a push-pull amplifier with current limiting and thermal shutdown that drives an output speaker connected between outputs 233 and 235 with synthesized voice audio signals from a voice synthesizer 239 or a synthesized siren sound audio signals from six-tone siren synthesizer 257. The lock and unlock control signals are inverted by power invertors 267 and 265 respectively and sent to a three-pin door-lock control connector 269 via printed circuit board conductors that are not numbered in any of the Figures. A five-pin relay drive connector 281 receives its control signals from invertors 273, 275, 277, and 279 to drive control relays in an external module for auxiliary channel 2, running lights, dome lights and headlights. Four more auxiliary output channels and three other outputs are driven by output power transistors and provided with relay kickback protection diodes. They are channel 3 at output 291, starter disconnect at output 305, ground when armed at output 313, channel 4 at output 321, channel 5 at output 329, channel 6 at output 337, and horn at output 345. LED 107 visual outputs, either red or green or both red and green, will give a visual indication of the status of the security system at all times.

A connector at 191 is used for enabling/disabling the radio frequency remote-control transmitter 25 program mode of controller 35. The jumper must be removed to program the system's remote-control transmitters.

The clock speed of the microcontroller is 10 megahertz and is established by quartz crystal 103, capacitors 99 and 101, and a resistor 105. Controller 35 clock, in conjunction with controller 35 program, establishes all of the system's timing.

The controller reset is generated by an active reset circuit consisting of resistors 49, 51, 55, and 61; transistors 57 and 59; diodes 53 and 65; and capacitor 63. When the 5-volt supply voltage drops below 4 volts, the reference at the base of transistor 57 drops below the required transistor turn-on voltage, which causes transistor 57 to turn off. When transistor 57 turns off, it removes the ground at the base of transistor 59, allowing the pull-up resistor 55 to pull-up the base of transistor 59, which turns on transistor 59, generating a reset.

The 12.6 volts DC power for control module 29 enters at 295 and the ground return exits at 299. A ceramic disc capacitor 297 is provided as a radio-frequency filter capacitor located at the power input. A diode 285 is provided as a reverse-protection power diode. Capacitors 229 and 221 are provided to act as a power-supply regulator pre-filter and post-filter respectively. A voltage regulator 223 is provided and preferably is a 5-volt micro power, 100-milliampere regulator. Ceramic disc capacitor 217 and the ferrite beads 215 and 219 are provided on the power traces of controller 35 to reduce radio frequency emissions therefrom which aids in maximizing the range of on-board RF receiver 33.

Figure 2B:
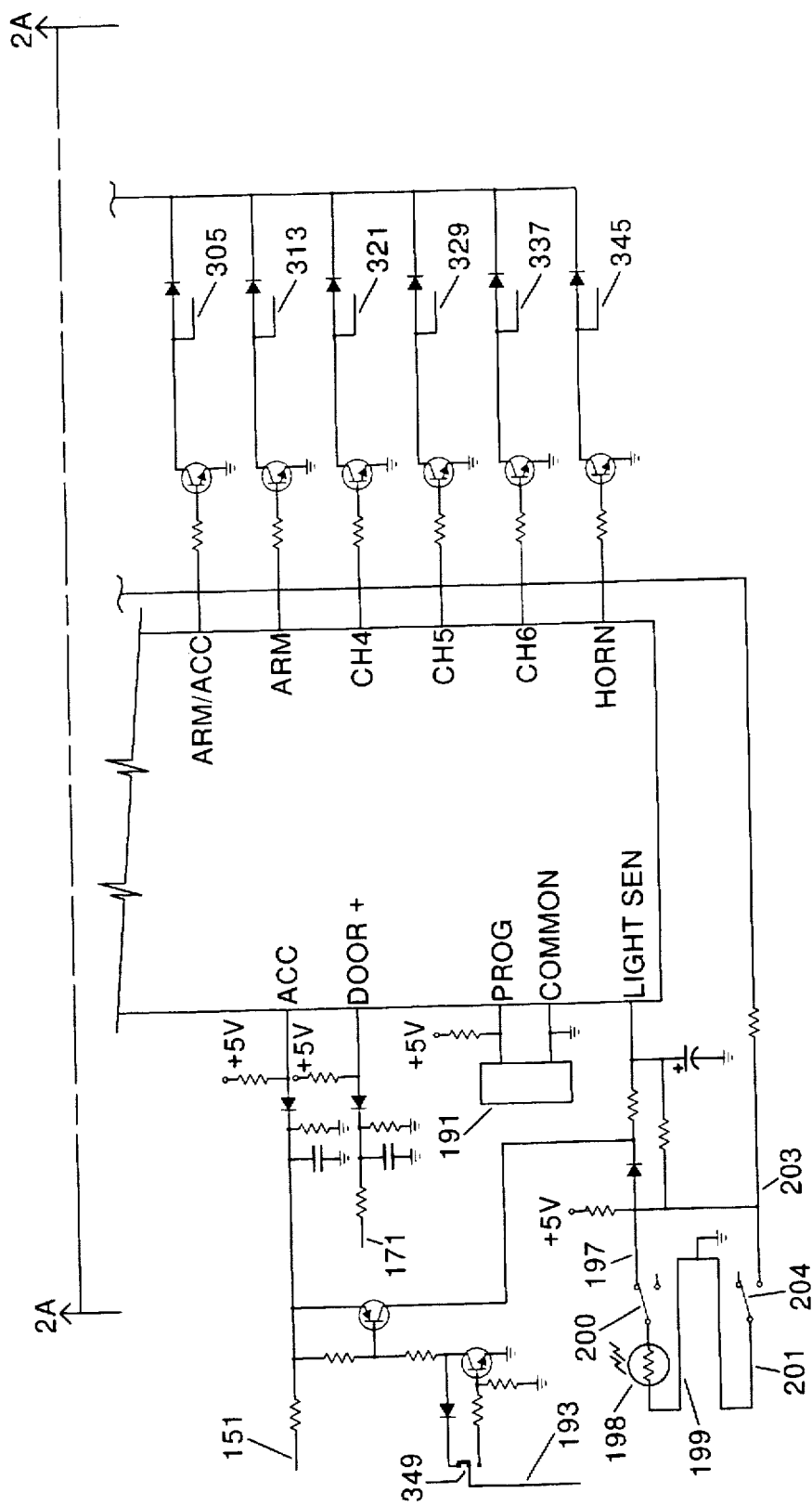

The first alternate embodiment of the soft-chirp feature is shown in FIG. 2B and shows that during chirps, the siren output 359 would be pulsed at a low-duty cycle rate, and a resistor 361 would limit the current of the pulses as the power is stored in a capacitor 363. A base drive resistor 365 is provided to limit the current from the limited power stored in capacitor 363 to the point that transistor 369 only pulls the input to base drive resistor 367 to, for example, a +10 volts instead of ground. Base drive resistor 367 input only being pulled to +10 volts supplies a very limited current to siren output transistor 371, which then only supplies a very limited current to siren output 373. This limited output current may only generate a voltage of, for example, 2 volts across the siren, which would significantly reduce the output volume of the siren chirps. During normal siren output, the output at 359 would be on continuously, supplying a hard drive to pre-drive transistor 369, which in turn would supply a hard drive to siren output drive transistor 371, which would then supply sufficient current to develop a full 12 volts across the siren, which would develop a full-siren volume.

A second alternate embodiment is shown in FIG. 2C and uses a separate output 375 from controller 35 to supply a limited drive to the siren output drive transistor 371. The output 375 from controller 35 would be on continuously during chirps. Base drive resistor 377 would then deliver current from the output 375 to turn on hard chirp pre-drive transistor 381. In this case, the base drive resistor 379 would be chosen to limit the drive current supplied to the siren output transistor 371, such that the current supplied to the siren would be limited significantly, producing a chirp of a much lower volume. Another embodiment for generating a soft chirp would be to use the alternate routing of the printed circuit board conductor as shown in FIG. 2C in dotted line. In this case, the limiting of the output power would be accomplished by choosing the appropriate value of base drive resistor 377. Using a large-value resistor at 377 would limit the base drive current to the chirp pre-drive transistor 381 so that the voltage at the input to base drive resistor 367 would be, for example, 10 volts. This would limit the base drive current available to siren output drive transistor 371, thereby reducing the output current to the siren, which would produce a reduced-volume chirp.

Figure 5A:
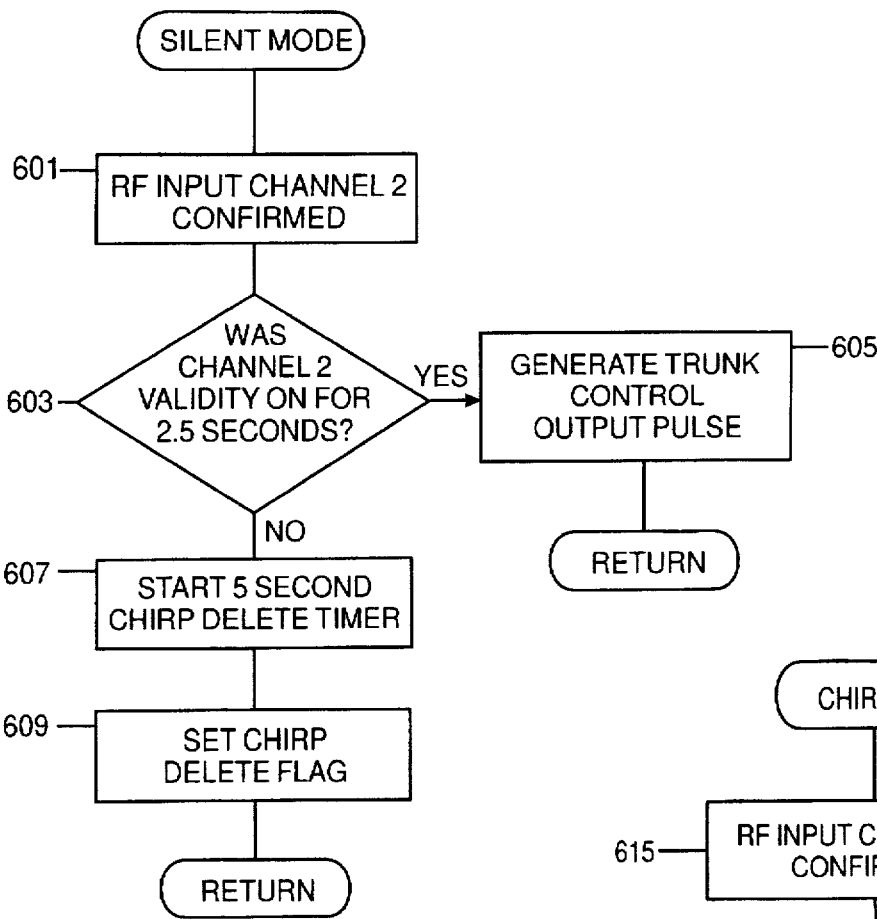
FIGS. 5A and 5B are flow charts of the means for deleting chirps/soft chirps using the remote-control transmitter without losing any of the security systems other functions.
Figure 5B:
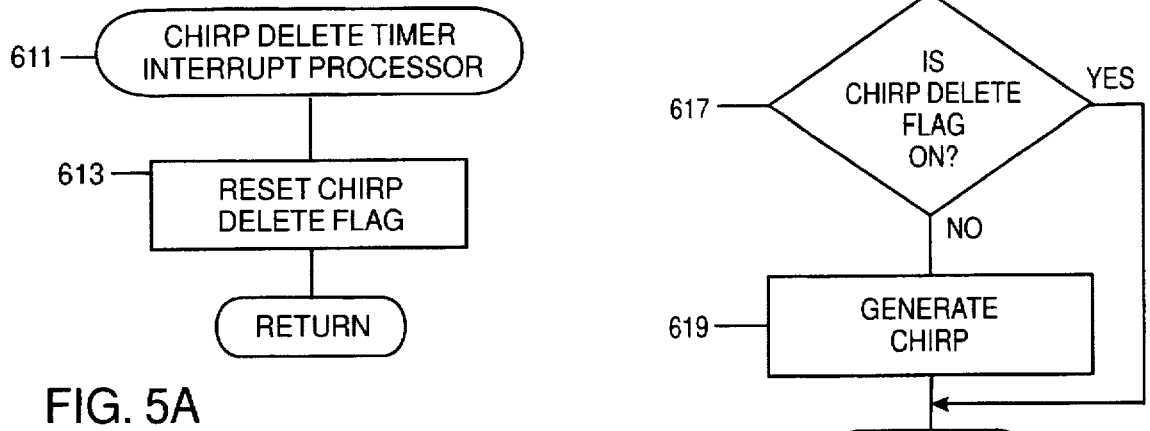

The security system of this invention is comprised of a number of important new features and functions. The first such feature is the "silent" mode as shown in FIGS. 5A and 5B. The silent mode is the deletion of the siren chirps or synthesized voice that normally accompany the arming or disarming of the vehicle security system. As is well-known in the art, most of today's radio-frequency remote-controlled vehicle-security systems acknowledge the confirmation of the arm/disarm commands with siren chirps, synthesized voice output and light flashes. Most of these security systems have the capability to permanently disable the audio portion of the acknowledgments by use of program switches, jumpers, or changes in the system's operating program. A few security systems have the capability to selectively disable these audio acknowledgments via the RF remote-control transmitter, but in all those instances, something is lost in the process. One such security system uses an auxiliary remote-control channel to disable the audible acknowledgment, but loses the use of that channel for other functions. Another uses a single remote-control transmitter channel, but the audible acknowledgment is delayed until a second signal is transmitted on the same channel and received. In this case, however, the delay becomes a nuisance to the user, and, further, if the first signal is not received, the second signal could be received as a first signal and cause the audible arming notification signal to be generated.

The method of selectively deleting the audio acknowledgment while using the RF remote-control transmitter 25 to arm and disarm the vehicle security system in this invention eliminates both of these shortcomings. The programmed channel 2 of this invention has a built-in channel-confirmation delay before the output pulse is generated. The channel 2 output is normally used for trunk release and has a built-in 2.5-second delay to prevent inadvertent release of the trunk. To silence the audible acknowledgments, the user presses channel 2, causing controller 35 to look for a channel 1 input within the next 5 seconds. Upon receipt of this channel 1 input, controller 35 will delete all audible acknowledgments of arming/disarming. The invention requires no loss of an auxiliary channel or the inconvenience of not having immediate acknowledgment of arm/disarm control signals.

Referencing FIGS. 5A and 5B, when controller 35 confirms an input from remote-control transmitter 25 channel 2, at 601, a time check is then made at 603 to determine if controller 35 should generate the trunk-control pulse or start the chirp-delete period. If channel 2 validity is confirmed for two and one half seconds, controller 35 proceeds to 605 to generate a trunk-control pulse to unlock the trunk. If not, controller 35 proceeds to 607, where the five-second audible acknowledgment deletion timer is started, then to 609 where the deletion flag is set. Thereafter, controller 35 returns to the normal operating mode to wait for other events to occur. If a security system arm/disarm command (from channel 1) is confirmed at 615 at this time, when controller 35 checks the audible acknowledgment (chirp) flag and finds it set at 617, controller 35 will bypass generating the audible acknowledgments at 619. When the deletion timer runs down to zero, an interrupt will be generated. When it is determined that the interrupt is a deletion timer interrupt, the interrupt processing routine at 611 is entered where the audible acknowledgment (chirp) deletion flag is reset at 613.

Another feature of the invention is the addition of three new sensor-input capabilities when the security system is armed: warn-away-only sensor input, dual level/warn-away with full-alarm trigger-sensor input, and a two-step door input. In the warn-away only sensor input, the warn-away-only input will not activate the full alarm mode of the security system, but on each new occurrence of the input will generate several seconds of siren chirps or synthesized voice output. This greatly reduces the nuisance of the security system for users who like their sensors highly sensitive. In the case of a field-disturbance sensor set at or near maximum sensitivity, the warn-away sensor input can generate several seconds of warn-away audible outputs if someone comes too near the vehicle even without touching it. Several seconds of chirps or synthesized voice is less of a nuisance than a full duration of the security system full-alarm mode.

In the dual level/warn-away with full-alarm trigger-sensor input, the dual-level sensor input will generate just the warn-away audible output the first time it is activated. If another activation of this sensor input occurs within about 10 seconds, it will trigger the full alarm mode of the security system; if not within the 10 seconds, it will trigger only the warn-away audible output. In the two-step door input feature, upon opening the door, controller 35 generates several seconds of chirps or voice warn-away after which controller 35 will move to the full alarm mode unless it is disarmed by the user using the transmitter 25.

Figure 6A:
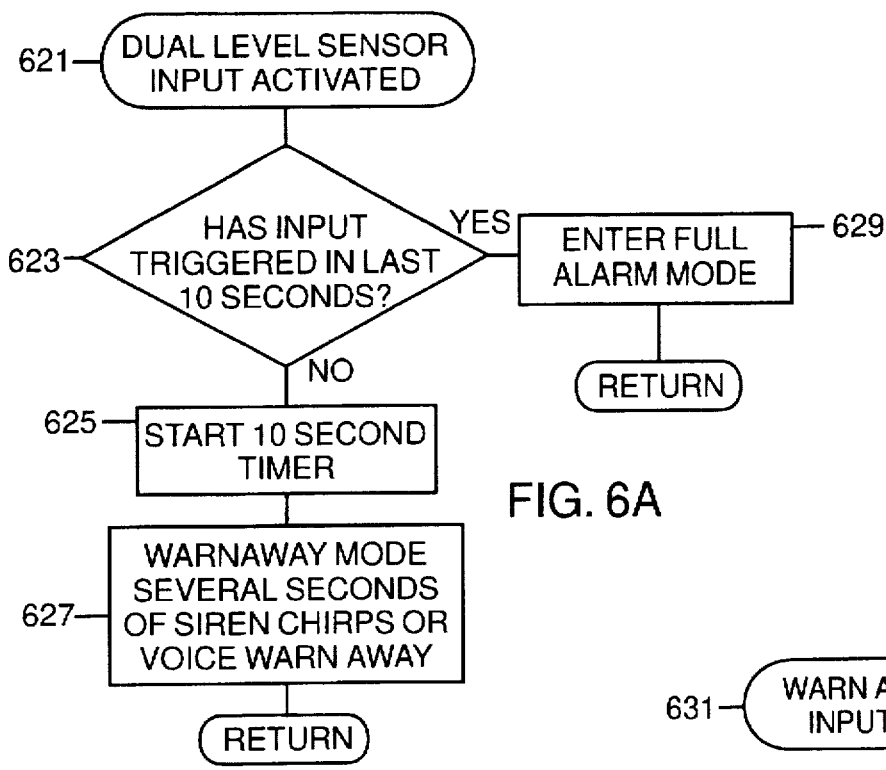
FIGS. 6A, 6B and 6C are flow charts of the feature allowing multiple levels of sensor inputs to control multiple levels of output device notification.
Figure 6B:
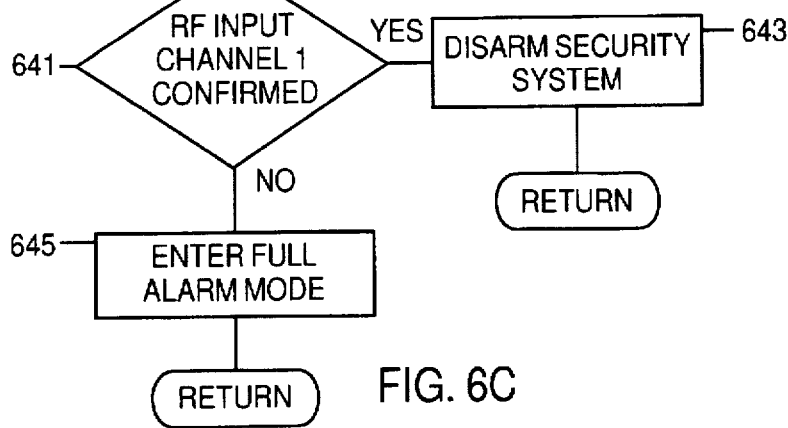
Figure 6C:
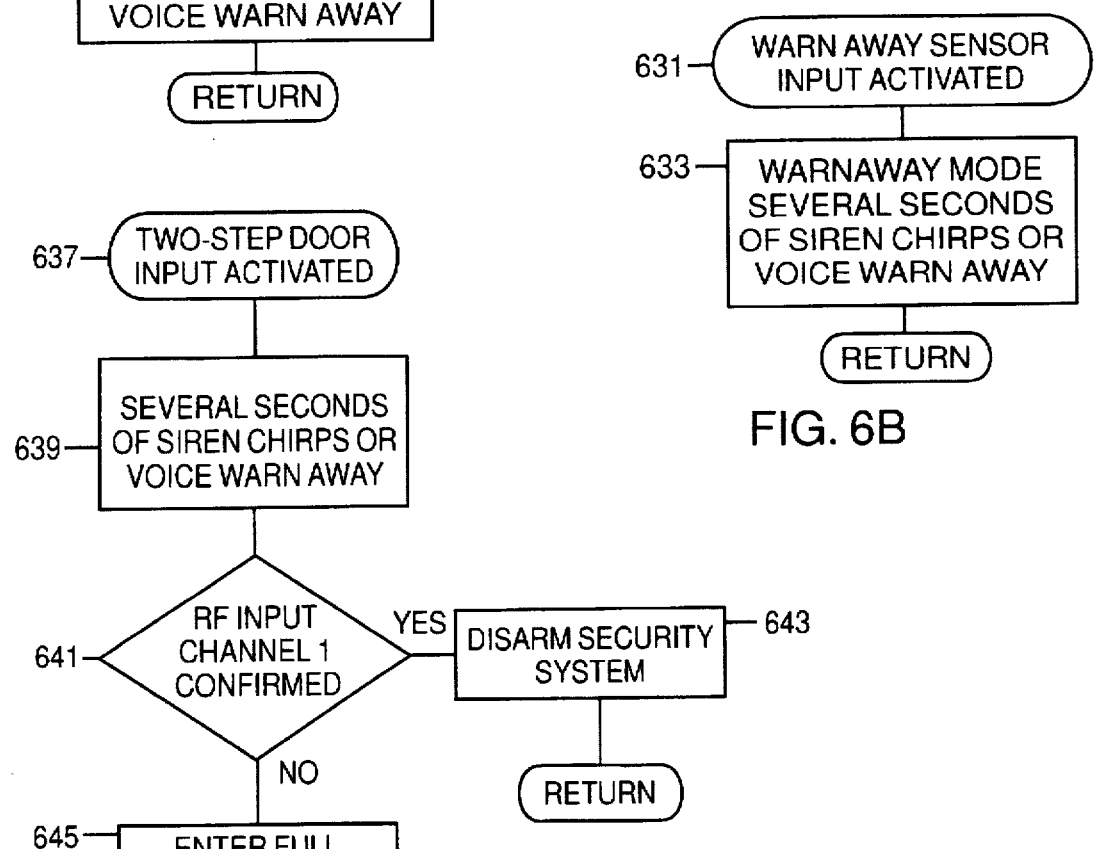

The warn-away, dual-level, and two-step features are depicted in FIGS. 6A, 6B and 6C and show the microcontroller operations of these functions. If the warn-away input is activated at 631, controller 35 proceeds to generate several seconds of siren chirps or synthesized voice at 633, after which it returns to the normal armed mode. When the dual-level sensor is activated at 621, controller 35 checks to see if the input has been activated in the last 10 seconds at 623. If the input has been activated in the last 10 seconds, the security system enters the full-alarm mode at 629, after which it returns to the normal armed mode. If the input had not been activated within the last 10 seconds, the 10-second timer at 625 is started and controller 35 goes into the warn-away mode and generates several seconds of siren chirps or synthesized voice output at 627, after which controller 35 returns to the normal armed mode.

The two-step door input feature is shown in FIG. 6C. When the input is activated at 637 by opening a door, controller 35 generates several seconds of siren chirps or synthesized voice output at 639. Controller 35 will always go into full alarm mode at 645 if controller 35 is not disarmed at 643 by transmission from remote-control transmitter 25 on channel 1 at 641.

Figure 7A:
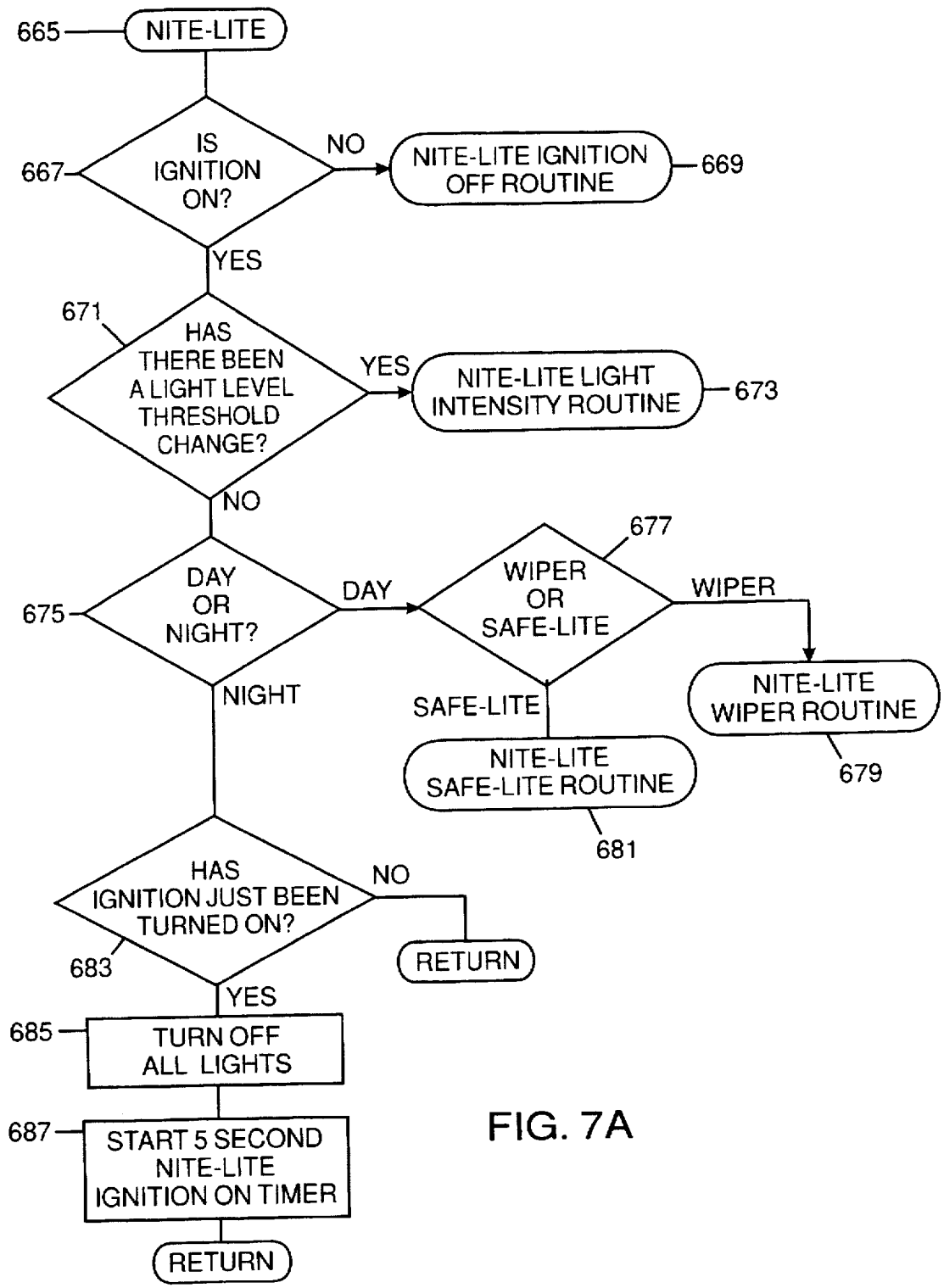
FIGS. 7A-7H are flow charts of the means for using a light sensor input to a security system, allowing the system controller to control the vehicle's light systems.

The next innovative feature of the invention, termed the "NiteLite" is shown in FIGS. 7A through 7H. The Nite-Lite feature uses a light sensor, such as a photoresistor, mounted on the dash panel. It is used to measure the level of the available light so that controller 35 may control the lights of the vehicle under various circumstances. Further, controller 35 controls the lights of the vehicle under entirely different circumstances. With respect to the light sensor used to control the lights as it relates directly to the security system, FIG. 7A shows the basic function of the "Nite-Lite". When the security system is armed or disarmed, day or night, controller 35 flashes the running lights one to four times upon receipt of the transmission from remote transmitter 25 channel 1. When the security system enters full-alarm mode during daytime, controller 35 flashes the running lights for the duration of the alarm condition. When the security system is armed at night, the headlights and running lights are turned on for 20 seconds; when the security system is disarmed, the headlights and running lights are turned on for 20 seconds or until the ignition is turned on, and the dome light is turned on for 60 seconds or until the ignition is turned on. During the full-alarm mode at night, the headlights are turned on and the running and dome lights are flashed for the duration of the alarm condition.

When the user is driving the vehicle, the light sensor will turn on the headlights and running lights at a predetermined lower light level after a predetermined delay, and turn them off at a predetermined higher light level after a predetermined delay. Also, when the vehicle windshield wipers are turned on in daytime, even in the intermittent mode, after a predetermined delay, the headlights and running lights will be turned on. At night, if the headlights and running lights are on (system was just disarmed) when the user enters the vehicle and the ignition is turned on, the lights will go out for five seconds to allow for cranking of the engine, then turn back on. Under control of the "Nite-Lite", and the vehicle is being operated with the lights on, when the ignition is turned off, the lights will go off for five seconds and then come back on and remain on for 20 seconds to allow for safe egress from the vehicle. If the lights remain on when the ignition is turned off, this draws attention to the user to turn off the light switch.

Other features of the Nite-Lite include a system light sensor 198 and override switches 200 and 204 in both directions. They are two single pole switches connected to wires 199 and 201 in one position and 197 and 203 in the other position. Light sensor 198 is in series with switch 200.

Actuating switch 204 (connecting 201 and 203) causes controller 35 to interpret the input as daytime; deactuating switch 200 (disconnecting 198 from wire 197) causes controller 35 to interpret the input as night time. "Safe-Lite" is the name given to the open or always-night characteristic of the Nite-Lite feature of the invention, but it can still use the light sensor 198 to determine whether it is day or night if switch 200 is activated. Safe-Lite provides for safer driving since the headlights and running lights will always be on when the vehicle is being driven (the ignition is on). Another feature of the Safe-Lite when linked with the light sensor is to connect the headlights in series during the day time, as an energy-conservation measure, while continuing to run them in parallel at night to obtain maximum brightness.

Figure 7B:
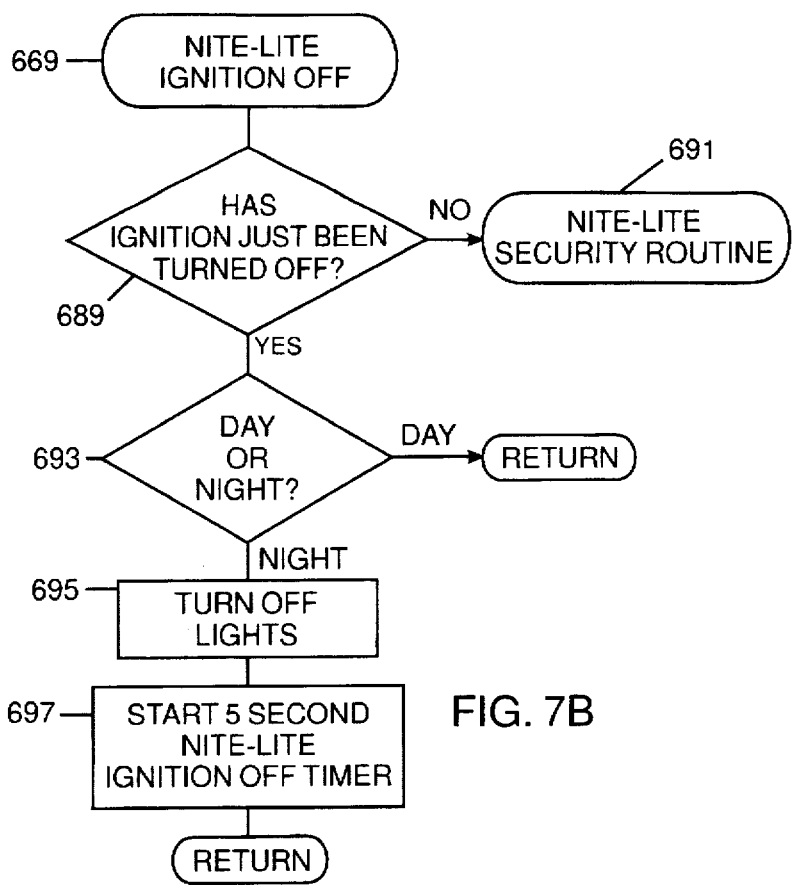

In FIG. 7A, if the ignition is not on at 667, controller 35 goes to the Nite-Lite ignition-off routine at 669, reference FIG. 7B. If the ignition is on at 667, controller 35 checks to see if there has been a light-level threshold change at 671 and, if there has, controller 35 proceeds to the Nite-Lite light intensity routine at 673, reference FIG. 7C. If no change has been recorded, controller 35 proceeds to check if it is day or night at 675. If it is night, controller 35 proceeds to check if ignition has just been turned on at 683. If it has, controller 35 turns off all lights at 685, starts a five-second "ignition on" timer at 687, and returns to the main program. If at 675, it is day time, controller 35 checks for wiper or Safe-Lite at 677 and proceeds to the appropriate wiper 679, reference FIG. 7D, or Safe-Lite 681, reference FIG. 7G, routine.

If the ignition is off at 667 in FIG. 7A, the security system proceeds to the ignition-off routine 669, as shown in FIG. 7B. If the ignition has not just been turned off at 689, controller 35 goes to the security routine 691, reference FIG. 7E. If the ignition has just been turned off at 689, controller 35 checks to see if it is day or night at 693, daytime, controller 35 returns to the main program; otherwise controller 35 turns off the headlights and running lights at 695, and starts a five-second ignition-off timer at 697, before returning to the main program.

Figure 7C:
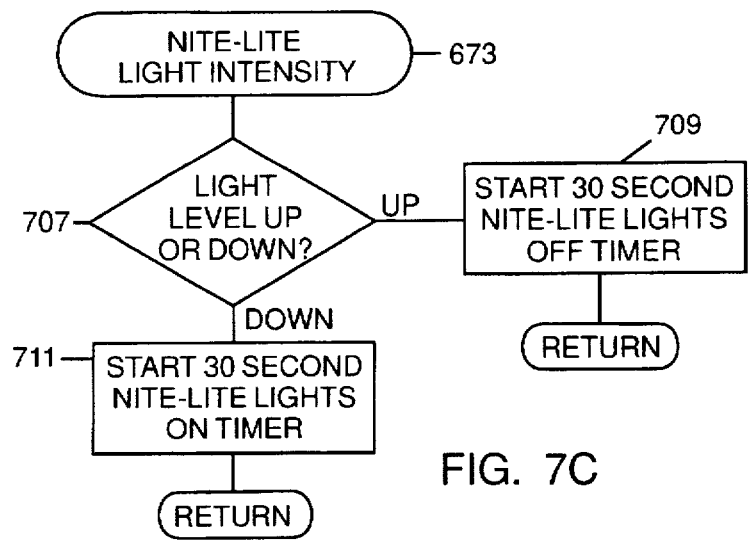

If the ignition has been on for a measurable period, when the "Nite-Lite" routine is entered, controller 35 proceeds to 673, as shown in FIG. 7C, where controller 35 checks the direction of the change at 707, since it has already been established that a change has occurred. An upward change [it is getting lighter] starts the 30-second lights-off timer at 709 and returns to the main program. A opposite or downward change starts the 30-second lights-on timer at 711 and returns to the main program. Thirty second delays are required to prevent controller 35 from turning the lights on and off every time controller 35 encounters brief periods of light change, such as when the vehicle goes under an overpass, etc.

Figures 7D, 7E:
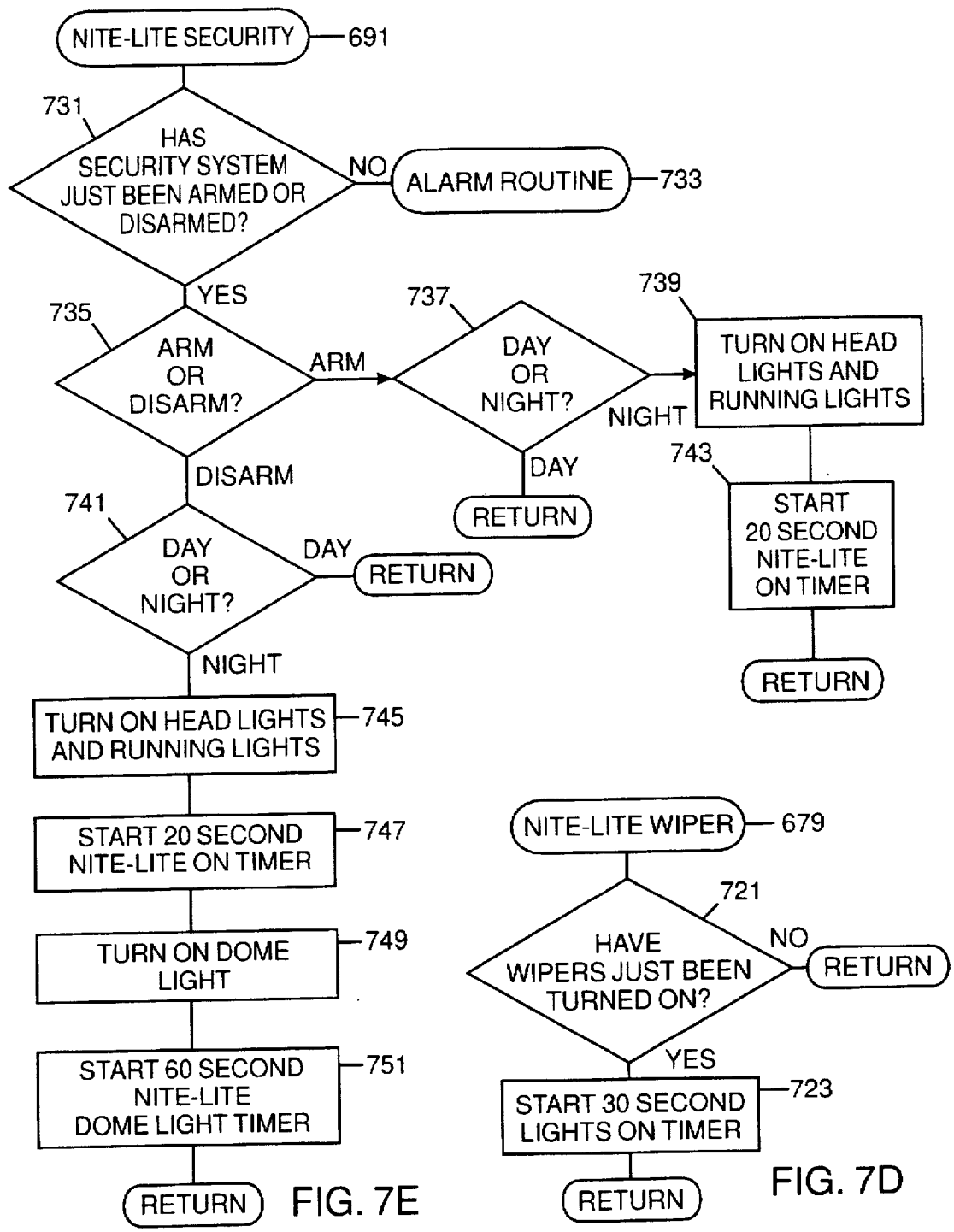

FIG. 7D represents a basic concept of the windshield-wiper routine. The system will operate with intermittent wipers even if they only operate once ever 15 seconds. In other words, if the light-sensor input goes active for a short period every 15 seconds, controller 35 will register it as a continuous input, keep the lights on or turn them on 30 seconds after the first input. The actual windshield wiper input circuit is as given above, but it is preferable to have a direct windshield wiper input to interface with the program to function as above so the light-sensor circuit will not be affected by the intermittent windshield wiper input function. t 721, controller 35 checks to see if the windshield wipers have just been turned on. If they have, the 30-second Nite-Lite lights-on timer is started at 723, before returning to the main program. If not, controller 35 returns directly to the main program.

The Nite-Lite security system routine shown in FIG. 7E controls the lights according to light conditions at the time a security function occurs. The first check is to see if the security system has been just armed or disarmed at 731. If not, controller 35 proceeds to the alarm routine 733, reference FIG. 7F. If the arming state has just changed, a check is made to determine if the security system was armed or disarmed at 735. In both cases, controller 35 then checks for day or night conditions at 737 and 741. If day conditions, controller 35 returns to the main program, where another routine (not Nite-Lite) flashes the running lights one to four times.

If the security system was just armed at 731/735 and it is night conditions at 737, controller 35 turns on the headlights and running lights at 739, then starts a 20-second lights-on timer at 743 before returning to the main program. If the security system was just disarmed at 731/735 and it is night conditions at 741, controller 35 turns on the headlights and running lights at 745, starts a 20-second lights-on timer at 747, turns on the dome lights at 749, and starts a 60-second dome-light timer at 751 before returning to the main program.

Figure 7F:
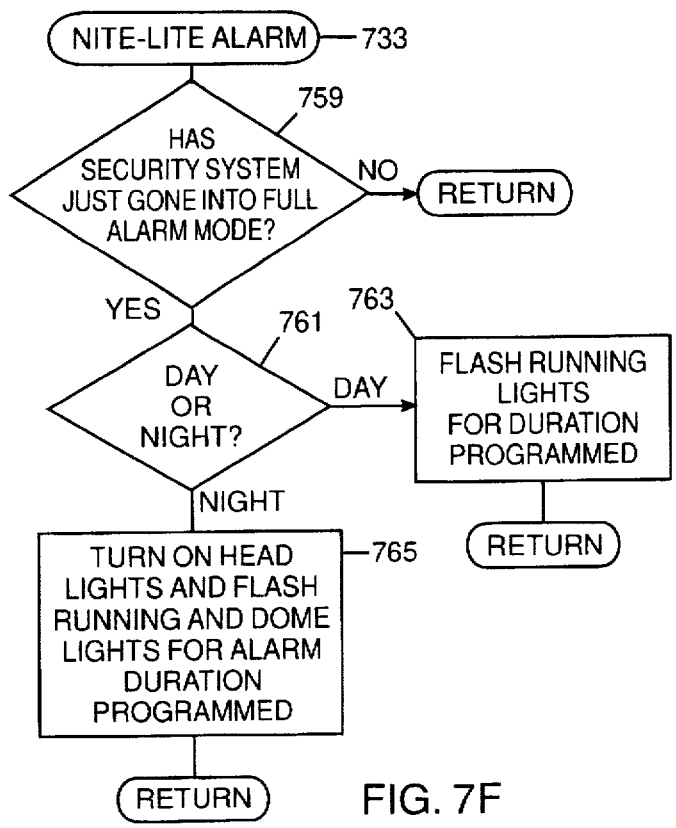

The Nite-Lite alarm routine 733, as shown in FIG. 7F, controls the lights during a full-alarm mode of the security system. Controller 35 rechecks to see if the security system has just gone into the full alarm mode at 759. If no full-alarm mode exists, controller 35 returns to the main program. If a full-alarm mode does exist, controller 35 checks to see if it is day time or night time at 761. In daytime, controller 35 flashes the running lights at 763 for the duration of the alarm. At night, controller 35 turns on the headlights and flashes the running and dome lights at 765 for the alarm duration.

Figure 7G:
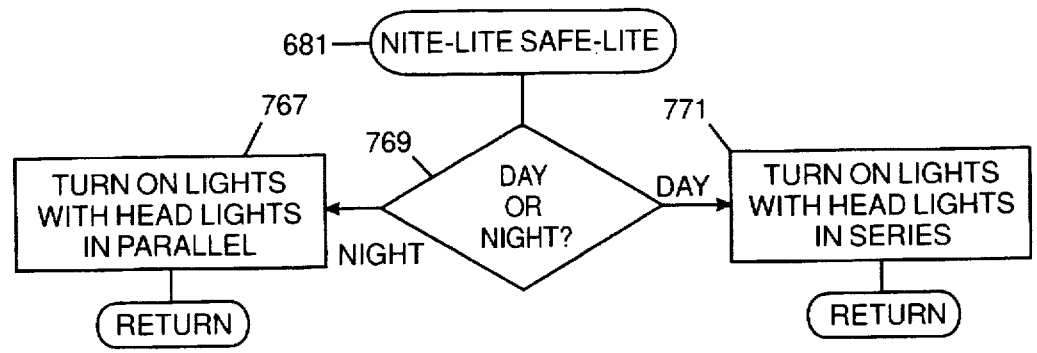

Safe-Lite is the capability of the Nite-Lite feature that turns on the headlights and running lights any time the ignition is turned on. In FIG. 7G, the light sensor allows the Safe-Lite feature to turn on headlights in series at 771 or in parallel at 767, depending on whether it is day or night at 769 respectively.

Figure 7H:
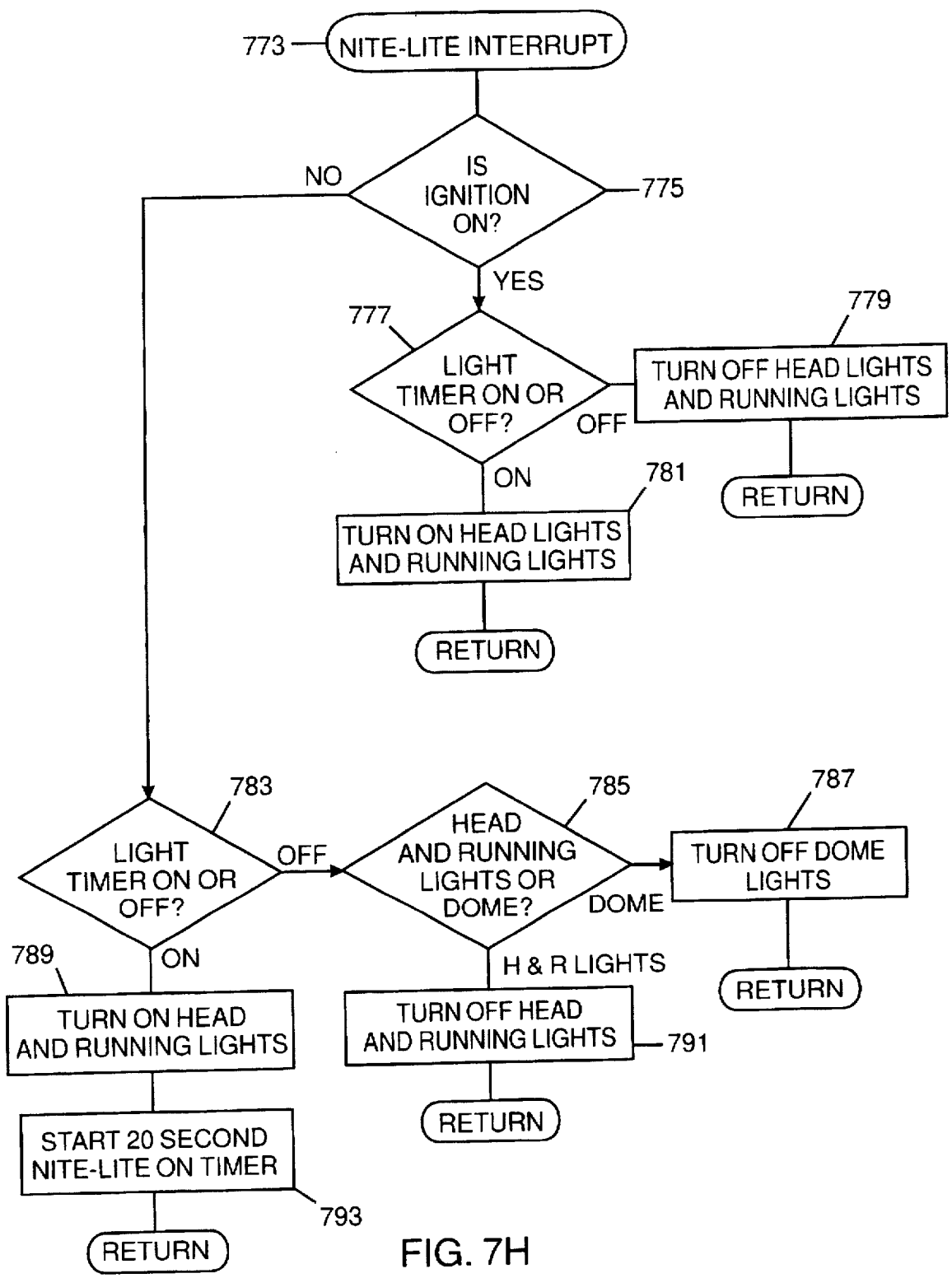

The Nite-Lite feature requires several timers that all generate interrupts when the time expires. This requires a routine to process these interrupts as shown in FIG. 7H. The first item checked in this routine is whether the ignition is on or off at 775. If it is on, controller 35 checks for on or off timer at 777. An off timer will turn off the headlights and running lights at 779, while an on timer will turn on the headlights and running lights at 781. If at 775 the ignition is not on, controller 35 again proceeds to check to see if it is an on-or off timer at 783. The on-timer interrupt turns on the headlights and running lights at 789 and starts a 20-second on timer at 793 before returning to the main program. The off-timer interrupt checks to see if the interrupt is for the headlights and running lights or dome light at 785, and proceeds to turn off the appropriate lights before returning to the main program. At 787 controller 35 turns off the dome lights, while at 791 controller 35 turns off the headlights and running lights.

Another feature of the invention is shown in FIG. 8A and is an advanced input-diagnostic and input-bypass capability in which an unstable input is bypassed (disabled) after starting four full-alarm cycles in one hour. The unstable input is thereafter bypassed for an additional hour from the time of any activation of the input during the one-hour bypass period, and the bypassing can only be terminated by the input remaining stable for one full hour or the security system being disarmed and the ignition being turned on. Each time an input is activated that causes the security system to enter the full-alarm mode, controller 35 goes through a routine that checks the stability of the input for the last one-hour period or starts a check for the next one-hour period.

The input-bypass routine 795, as shown in FIG. 8A, starts by checking to determine if the security system is armed at 797. If the system is not armed, controller 35 checks to see if the ignition has just been turned on at 799, and if it has, controller 35 will reset all bypass flags, activation counters and associated timers at 801 before returning to the main program. If the security system is armed at 797, the input activation-counter of controller 35 is incremented at 803 and the count is checked to see if the input has been activated four times in the last hour at 805. If this is the fourth activation, the input-bypass flag is set for this input at 807, the bypass timer is set to one hour and started at 811, then controller 35 returns to the main program without generating an alarm output. If the input was not the fourth activation in one hour at 805, controller 35 checks to see if the bypass flag has been previously set at 809. If it has been set, controller 35 proceeds to 811. If the flag is not set at 809, controller 35 checks to see if the input-bypass activation timer is running at 813. If it is not, it means this is the first activation of this input. Controller 35 then proceeds directly to 819, where the input-bypass activation timer is reset to zero and started. Thereafter, controller 35 proceeds to the full-alarm mode at 821. If the timer is running at 813, a check is made to see if the timer is above or below one hour at 815. If it is above one hour, this input has not triggered in the last hour, so the activation counter is set to "1" at 817 and the timer is reset to "0" and started, before going to the full-alarm mode at 821. If the input-activation timer is below one hour at 815, controller 35 proceeds directly to the full-alarm mode at 821. There is one input bypass timer in controller 35 for each input that has been activated. If an input-bypass timer decreases ("decrements") to zero, an interrupt is generated, causing controller 35 to go to the bypass-timer interrupt processing routine at 827, as shown in FIG. 8B. This resets the input-bypass flag for the appropriate input at 829, then returns to the main program.

Figure 9:
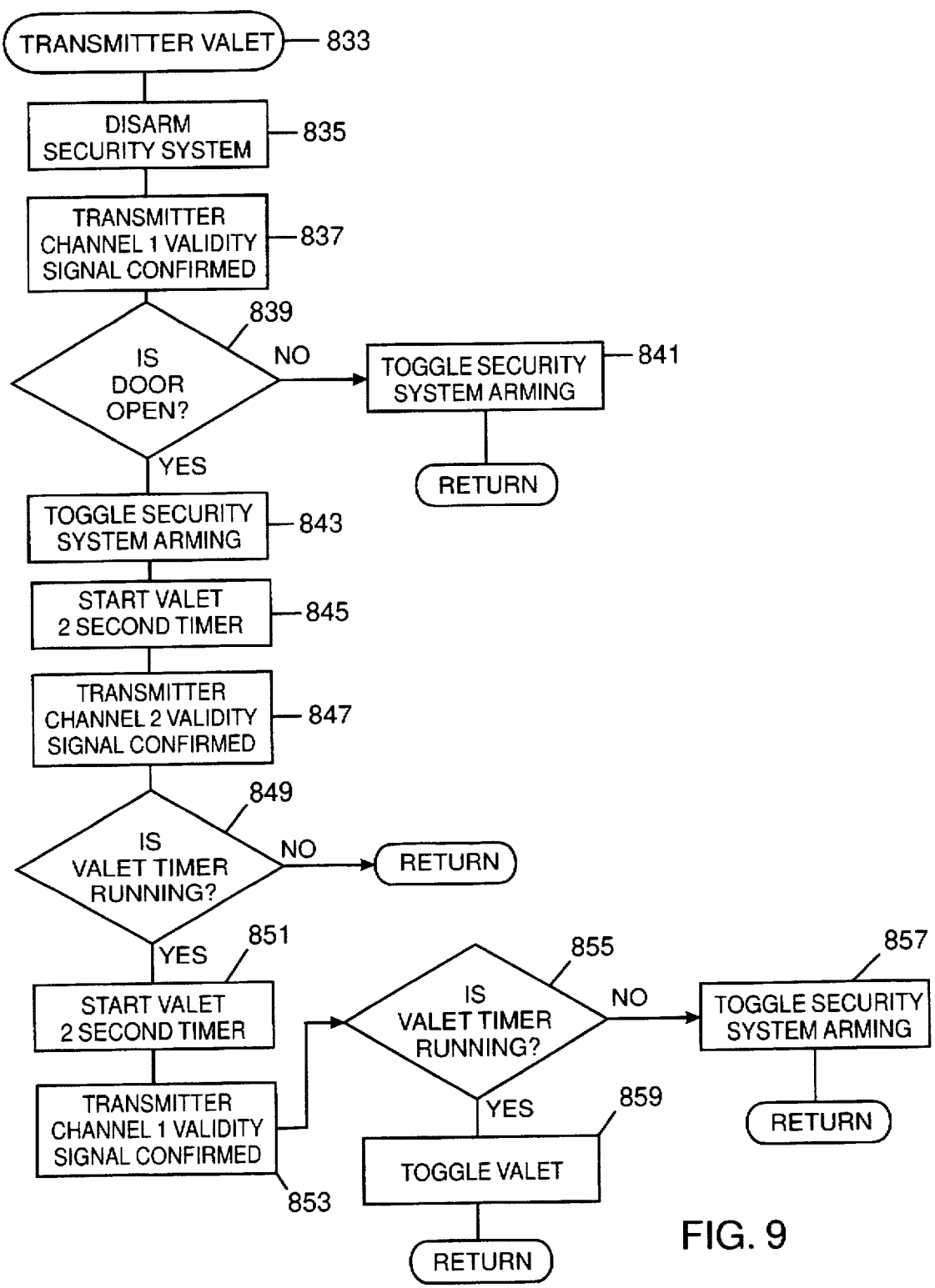
FIG. 9 is a flow chart of the means for entering or exiting "valet" mode using the security system's remote-control transmitter and one of the vehicle's doors.

Another feature of the invention is the capability of putting the security system into and out of "valet" mode by using transmitter 25 and one of the vehicle's doors, as shown in FIG. 9. This simplifies the entry and exit of "valet" mode for the user. The security system still has the capability to enter or exit "valet" using the dash mounted system valet switch when the ignition is on.

The routine begins at 833 and, as shown in FIG. 9, by disarming the security system at 835, opening a door of the vehicle at 839; and confirming receipt of a signal from security system remote-control channel one at 837. Then, within two seconds at 845 and 849, confirming receipt of a transmission from security system remote-control channel two at 847, and again within two seconds at 851 and 855 confirming receipt of a transmission from remote-control channel one at 853. Controller 35 toggles the valet function at 859. During the process, controller 35 will always toggle into the arm mode at 843. If at any time during this operation the constraints specified above are not met, controller 35 will toggle between the security system arm/disarm modes at 841 and 857.

Figure 10A:
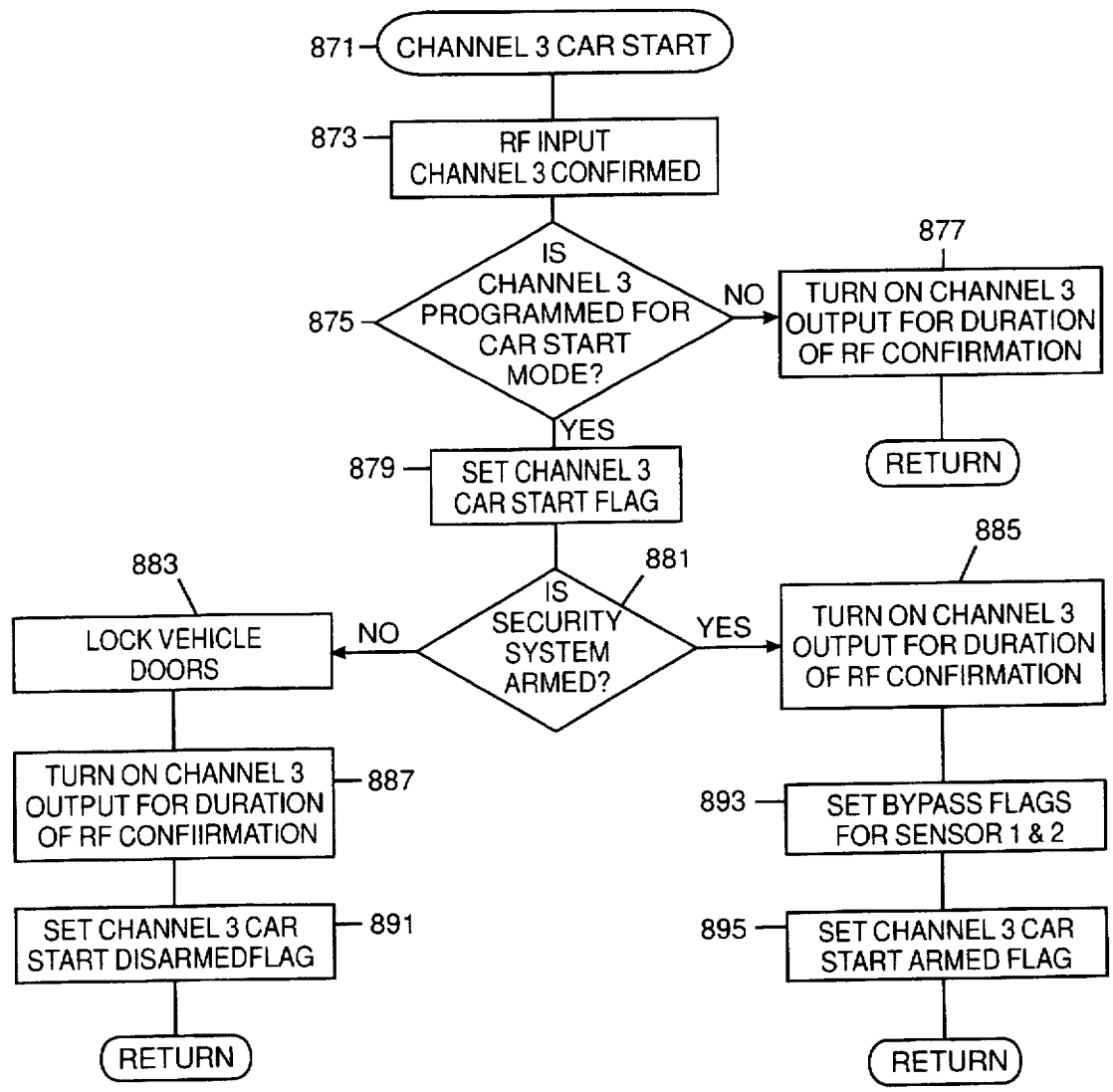
FIGS. 10A-10C are flow charts of the means for remote-starting the vehicle while maintaining maximum security and safety.
Figure 10B:
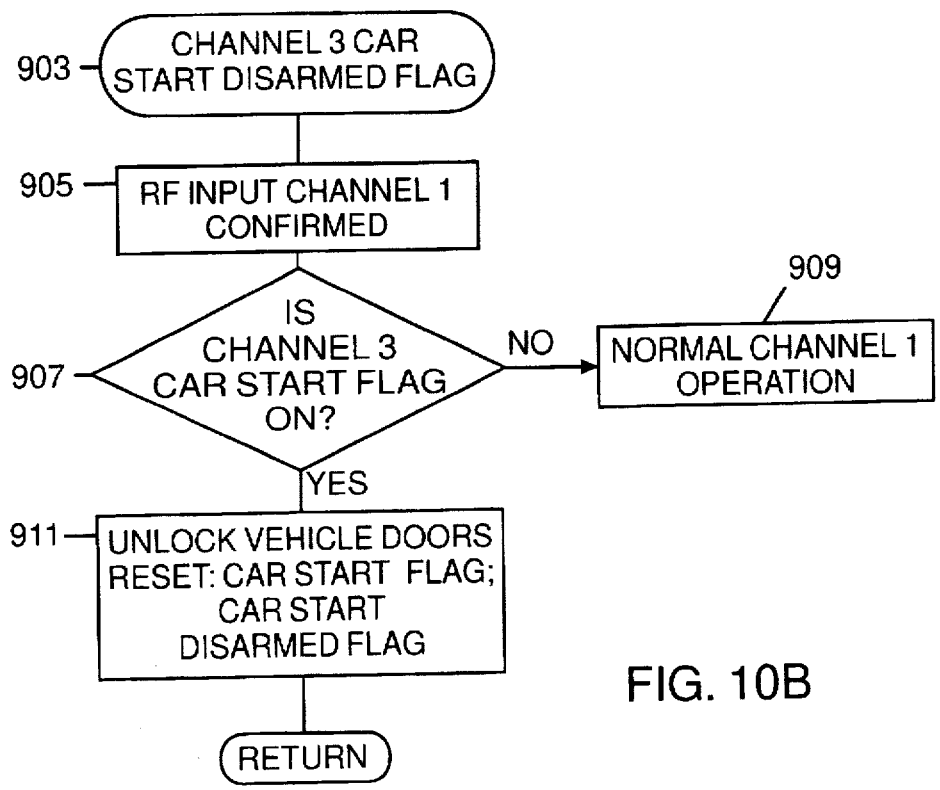
Figure 10C:
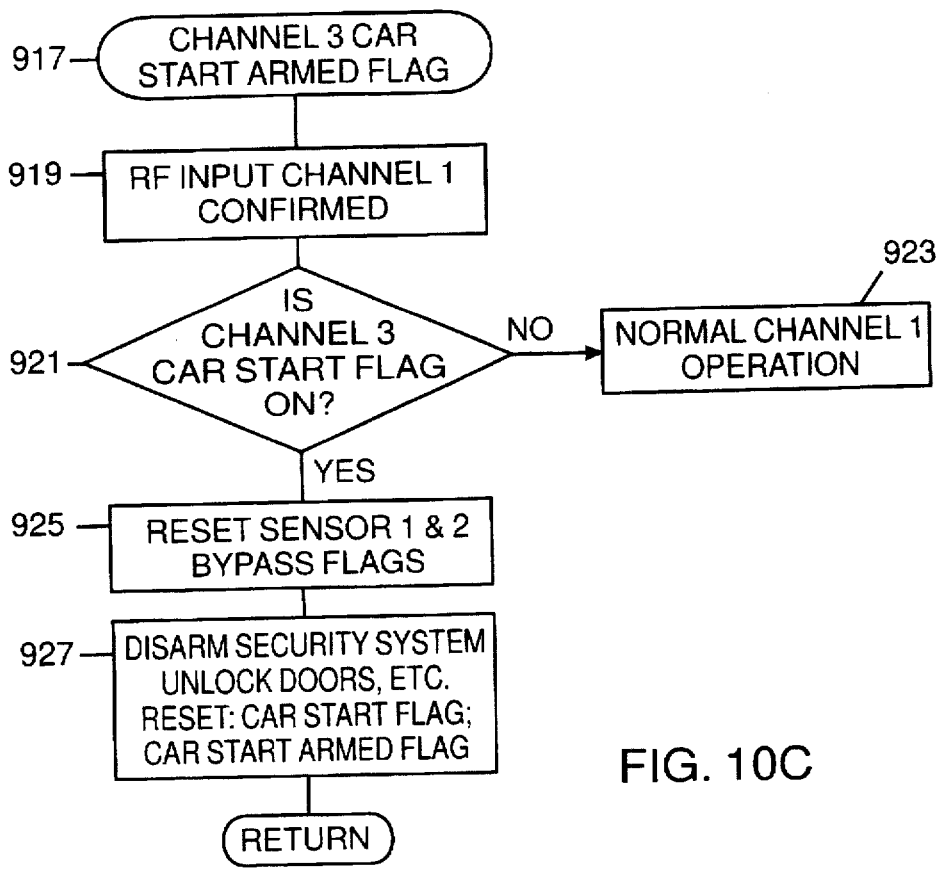

Programming one of the security system's auxiliary control channels [channel 3], to operate a remote car-start module, is another of the invention's features and is shown in FIGS. 10A–C. This capability is enabled or disabled when the system operational functions are programmed. By customizing channel 3 to be used as a remote car-start output channel, the security system can disable the sensor inputs (radar, shock, motion, etc.) while maintaining a significant level of security by keeping all the other inputs active when the security system is in the armed mode.

In car start routine 871, when receipt of remote-control transmitter 25 channel 3 is confirmed at 873, controller 35 checks to see if channel 3 has been programmed for car-start mode at 875. If it has not, the auxiliary channel 3 output is turned on for the duration of the control-channel confirmation at 877 (as long as the remote-control transmitter 25 button is depressed), before returning to the main program. If remote-control transmitter 25 channel 3 is programmed for car start, then the car-start flag is set at 879 and a check is made to see if the security system is armed at 881. If the security system is not armed, the doors are locked at 883, channel 3 output is turned on for the duration of channel confirmation at 887, and the car start disarmed flag is set at 891 before returning to the main program. If at 881 the security system is armed, controller 35 turns on channel 3 output for the duration of the transmission of remote-control transmitter 25 channel three confirmation at 885, sets bypass flags for sensor inputs one and two at 893, then sets channel three car-start armed flag at 895 before returning to the main program.

In the channel 3 car start disarmed flag routine 903, as shown in FIG. 10B, when receipt of a transmission of remote-control transmitter 25 channel one is confirmed at 905 and the channel three car-start flag is on at 907, the security system unlocks the vehicle's doors, resets the car-start disarmed flag and the car-start flag at 911, before returning to the main program; otherwise channel 1 operations are normal for the main remote-control transmitter 25 channel 1, at 909. In the channel 3 car start armed flag routine 917, as shown in FIG. 10C, with the car-start armed flag set when receipt of remote-control transmitter 25 channel 1 is confirmed at 919 and the channel 3 car-start flag is on at 921, controller 35 resets sensor one and two bypass flags at 925, disarms the security system, unlocks the vehicle's doors, and resets the car-start-armed flag and the car-start flag at 927, before returning to the main program; otherwise, channel 1 operations are normal at 923.

Another feature of the invention allows all system-programmable operational functions to be selected using the security system remote-control transmitter 25. Function programming is shown in FIG. 11 and is accomplished by using the security system's normal inputs (door, ignition, and valet) to put the security system into the function programming mode, then using the security system's remote-control transmitter 25 to toggle the operational function to the desired state.

Figure 11:
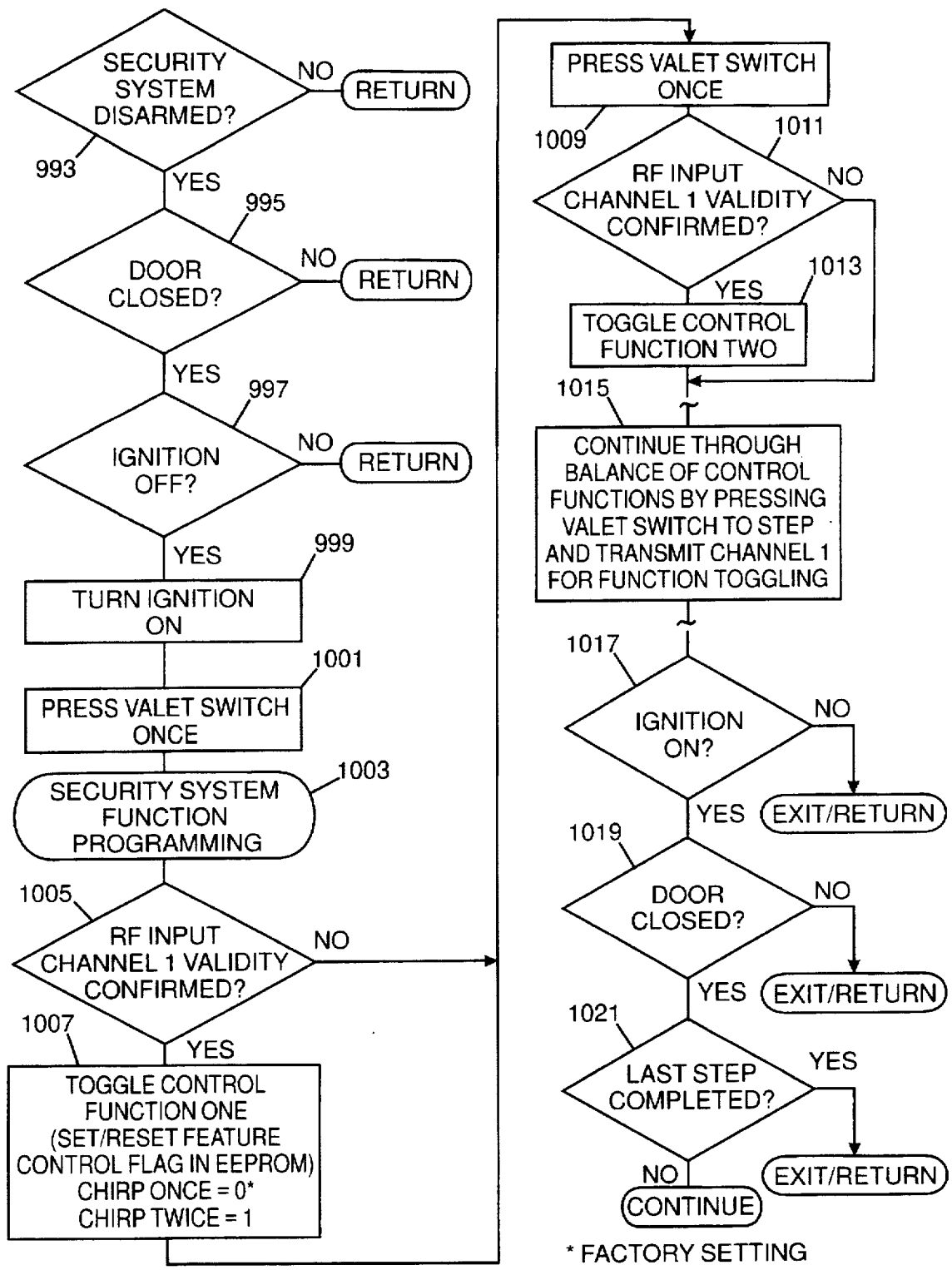
FIG. 11 is a flow chart of the means for programming the selectable operational functions using the remote-control transmitter.

In FIG. 11, the security system must be disarmed at 993, the doors closed at 995, and the ignition must be off at 997 to initiate the sequence required to begin entry into the security-system operational-function programming mode. The ignition must then be turned on at 999 and the valet switch must be pressed once at 1001 to enter the operational-function programming mode at 1003. At this time, the state of the first operational-function can be toggled at 1007 using remote-control transmitter 25 at 1005. If the user does not desire to change the state of this function, he or she may advance to the next selected function by depressing the valet switch once at 1009 for each function at 1015. If one desires to toggle function two at 1013, then the operator activates remote transmitter 25 at 1011. There are only two states of any function, a factory-default state and an alternate state. Accordingly, one chirp denotes the factory-default state, while two chirps denote the alternate state. At any time a particular function is selected, that function's state can be toggled by using remote-control transmitter 25 at 1015 or not toggled by pressing the valet switch at 1009 to advance the operational function selection to the next in the sequence. At any time, the user can exit the operational-function programming mode by turning off the ignition at 1017, opening a door at 1019, or stepping through the balance of the programmable operational-functions at 1021.

Figure 12A:
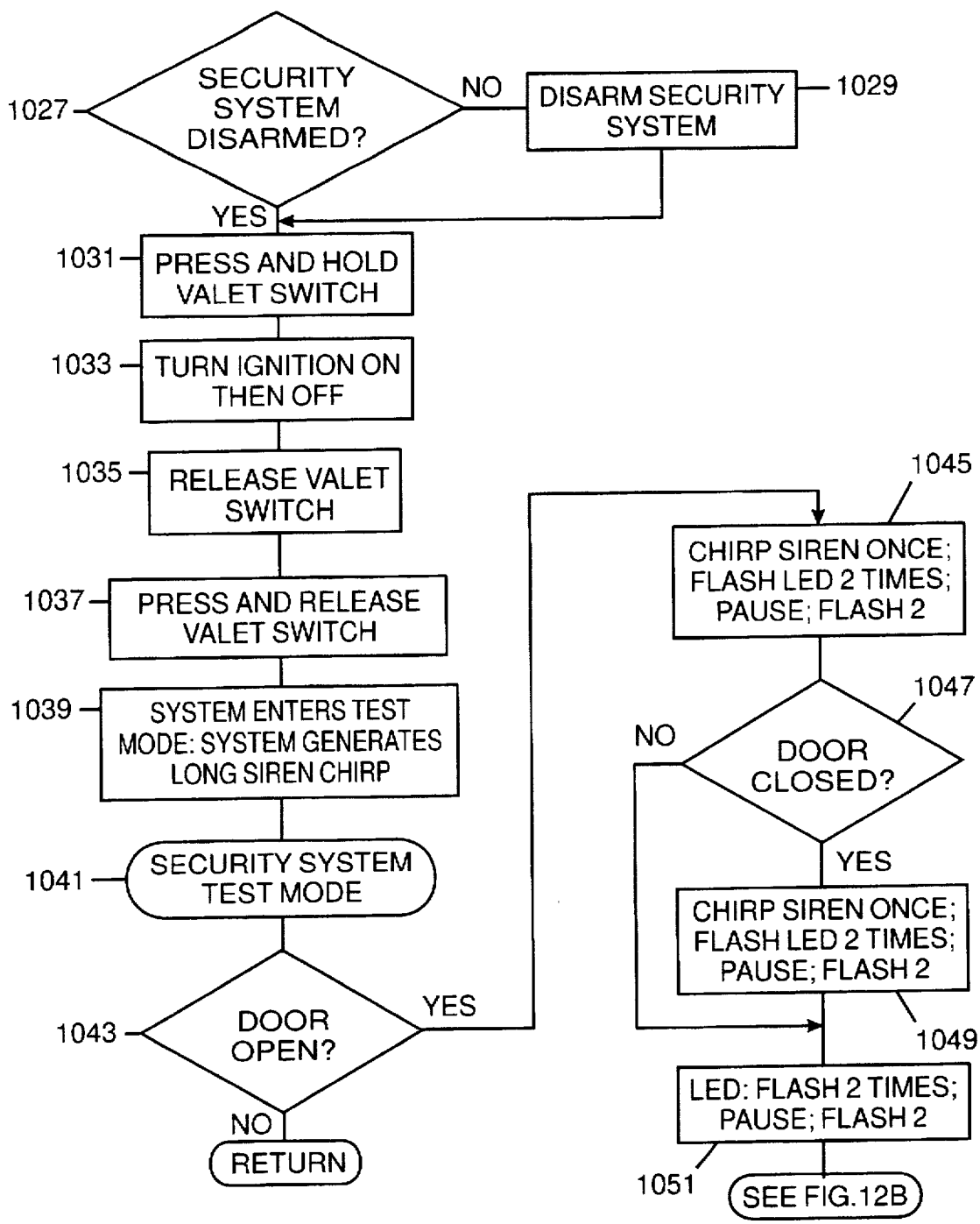
FIGS. 12A, 12B and 12C are flow charts of the means for testing a security system installation and its radio-frequency remote-control transmitter range.
Figure 12B:
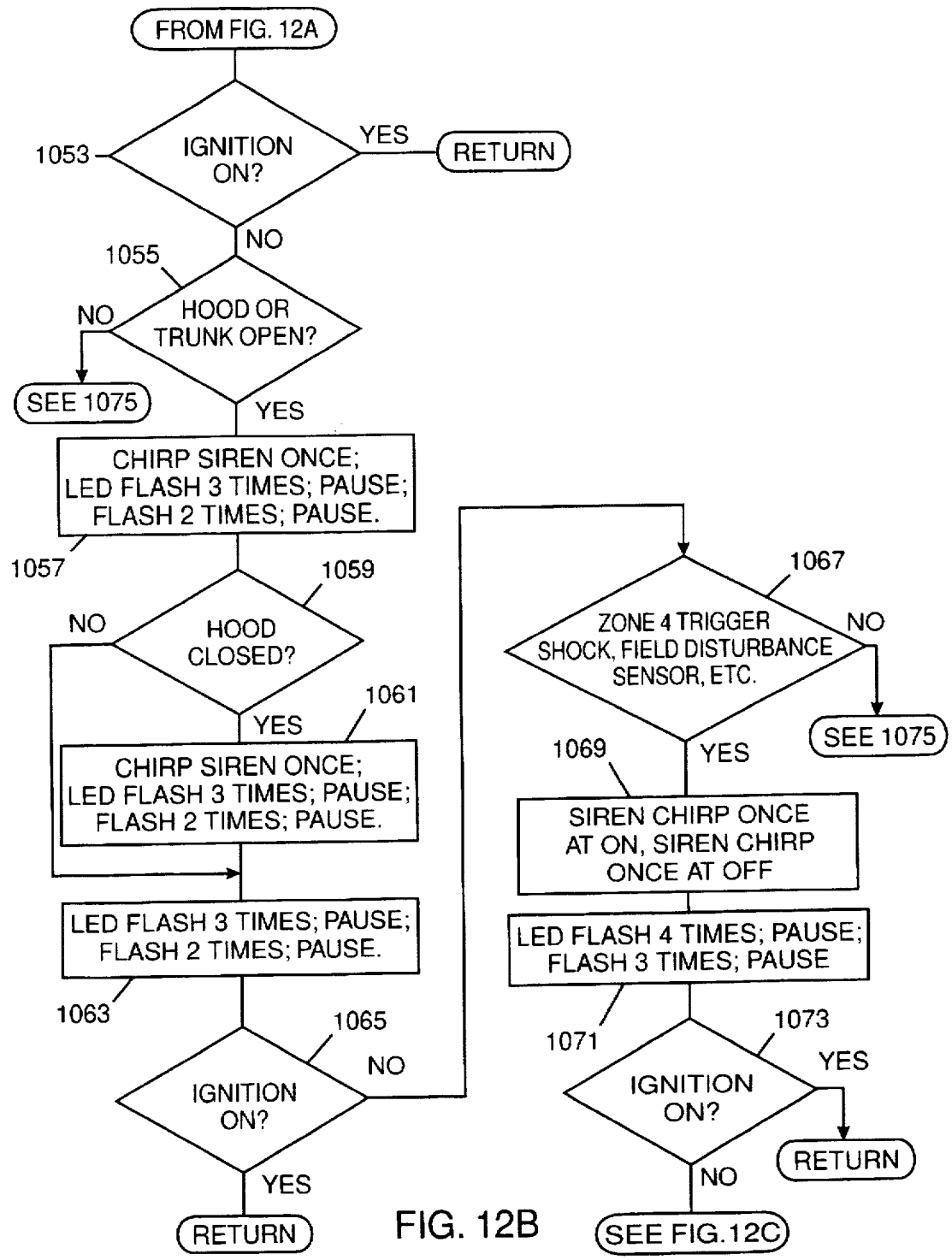
Figure 12C:
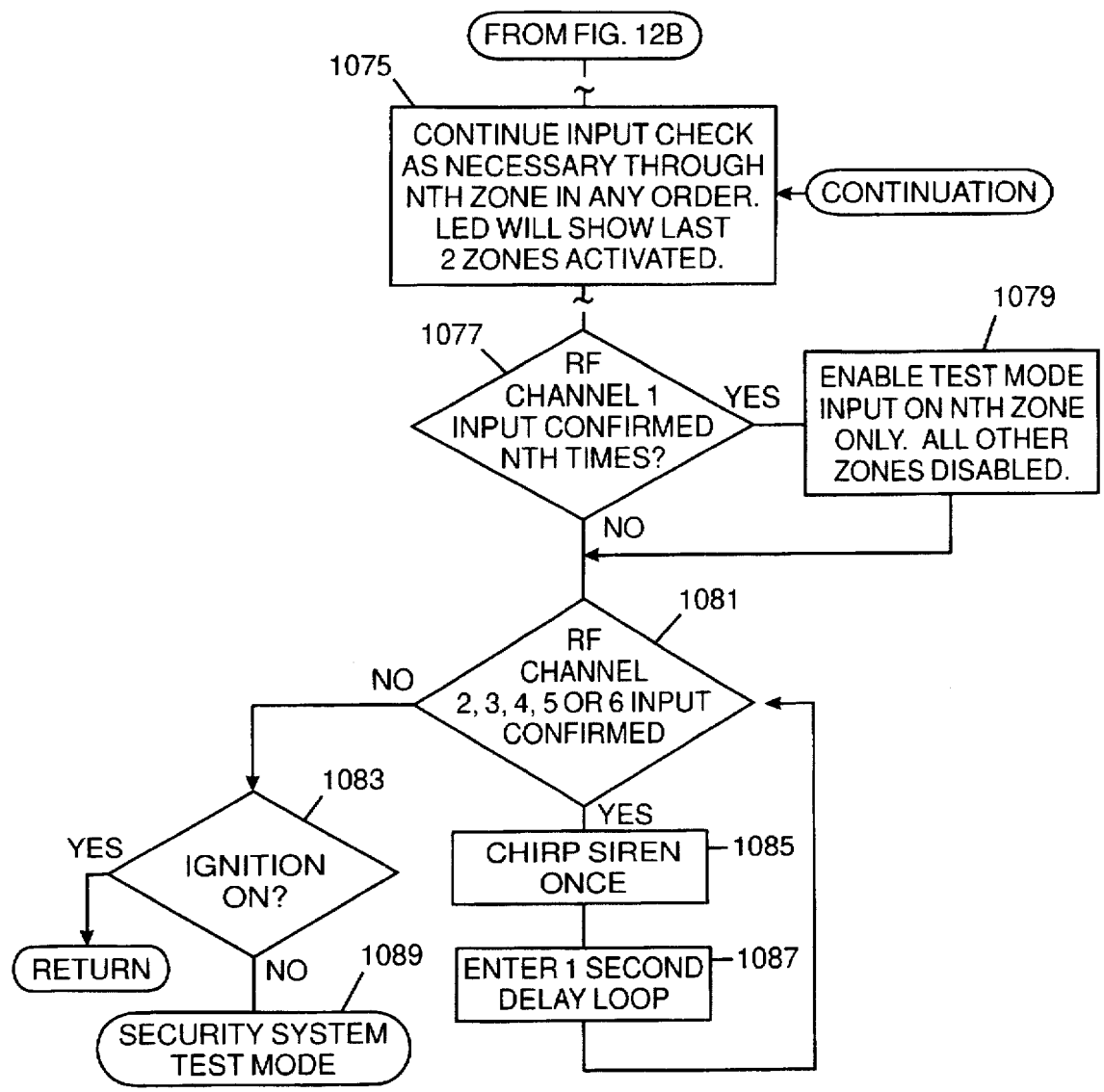

The next new feature of the security system, the "test mode" is shown in FIGS. 12A, 12B and 12C is a significant aid to the security-system installer. This feature allows the installer or the user to conduct a complete test of all of the security system's inputs, including inputs from remote-control transmitter 25. Access to this test mode is somewhat involved, but the steps are necessary to prevent inadvertent entry which would eliminate the security of the security system. In this test mode, the user may choose any input for testing and the security system will respond with a siren chirp when the input goes active, and another siren chirp when the input goes inactive. At the same time, the security system's lightemitting-diode, LED 107, will indicate the last two inputs (zones) activated.

As shown in FIG. 12, to enter the security-system test mode, the security system must be disarmed at 1027-9. Valet switch 122 must then be pressed and held at 1031, the ignition turned on and off at 1033, valet switch 122 released at 1035, and pressed and released again at 1037. Controller 35 then enters the test at 1041 mode and acknowledges with a long siren chirp at 1039. While in the test mode, any input may be checked at any time until receipt of a transmission from remote-control transmitter 25 channel 1 is confirmed at 1077. Thereafter, any particular input may be selected by depressing the channel 1 button on transmitter 25 the number of times corresponding to the number of that input. Examples of input testing are shown in FIGS. 12A and 12B by numbers 1043–1071.

For example, when the door is opened at 1043, the siren chirps once to acknowledge the door-open input going active and LED 107 flashes twice at 1045, to indicate that it is a zone 2 input. LED 107 will continue to flash twice at 1045, with a short pause between groups of flashes to continue to indicate that zone 2 was the zone from which the last two inputs came. When the door is closed at 1047, the input goes inactive; and at 1049 controller 35 acknowledges the door going inactive with another siren chirp, while LED 107 continues its flashing at 1051. LED 107 will continue to flash as above until another input is activated at 1055 or the ignition is turned on at 1053, at which time controller 35 will exit the test mode and return to the main program.

In another example, after the door input is tested, the hood or trunk is physically opened, activating zone three at 1055. The siren chirps once to acknowledge the input going active and LED 107 flashes 3 times (indicating zone 3), pauses, flashes twice at 1057 indicating that the previous input was from zone 2. When the hood or trunk is closed at 1059, the input goes inactive, controller 35 acknowledges the input going inactive with another siren chirp, while the LED 107 continues to flash as above at 1061. Again the LED will continue to flash as above at 1063 until another input goes active at 1067 (zone 4 acknowledged by chirps at 1069 and zone identification displayed at 1071) or 1075, or the ignition is turned on at 1053, 1065, 1073 or 1083, which in these instances will cause controller 35 to exit the test mode.

If at 1077 receipt of a transmission from transmitter 25 channel 1 is confirmed for a selected number of times, that selected zone and only that selected zone can be tested at 1079. A major feature of the security system test mode is the capability to test the range of the transmitter 25 by using any of the channels except channel 1. While in the test mode, if any of the auxiliary channel inputs are confirmed at 1081, the siren will chirp once a second at a test loop comprising 1081, 1085, and 1087 for as long as the input channel is confirmed at 1081. This allows the installer or user to walk away from and around the vehicle to test the range of transmitter 25 without operating any of the security system's functions except for the chirping siren. If the installer or user notices a loss in chirping while in any specific location around the vehicle, control module 29 may be moved to a new location or an extender antenna may be added to increase the system RF range.

Figure 13:
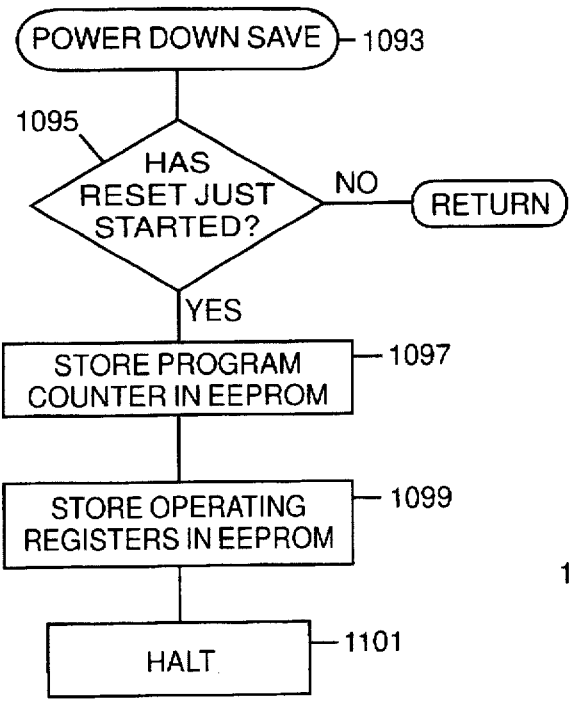
FIGS. 13 and 14 are flow charts of the means for restoring a security system status after a power disconnect.
Figure 15:
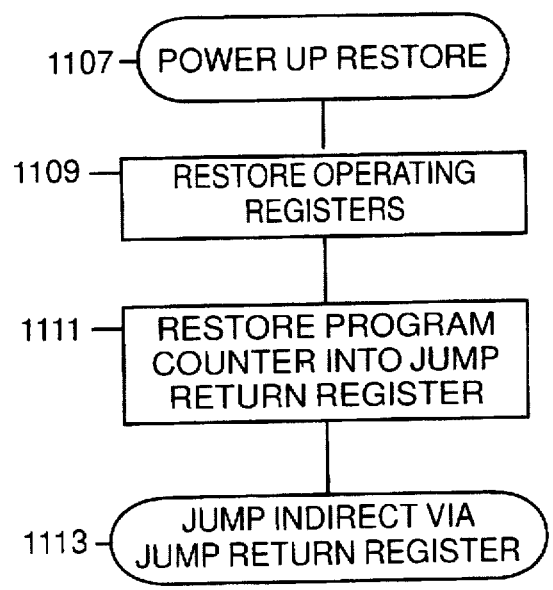
FIGS. 15 and 16 are flow charts of the means for generating soft chirps by pulsing the siren output during chirps or reducing the siren output voltage/current during chirping; and, FIG. 17 is a copy of FIG. 3 of parent application Ser. No. 08/112,940 showing a common output of multiple pulses for multiplexed transmission of these pulses over a single wire to the controller.

Another feature of the invention is the capability of the security system to restart itself after a power failure to the same conditions in effect when the power failure occurred. In FIG. 13A, at power-down at 1093, controller 35 checks for the initiation of its reset function at 1095. If controller 35 has just entered reset, it stores the program counter at 1097, and the operating registers (in RAM) at 1099 in permanent memory, before halting the program. In FIG. 15, when power is restored at 1107, the operating registers are restored at 1109 and the program returns to the point it was operating when the power failed at 1111 and 1113.

Figure 16:
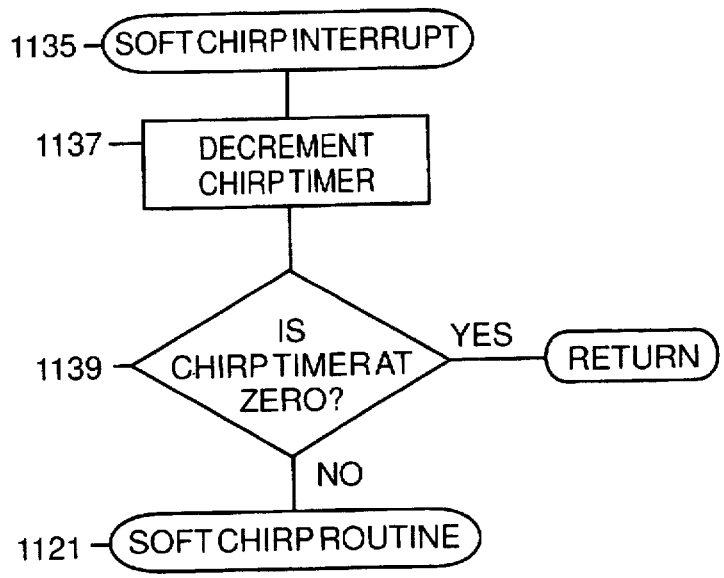

Another feature of the invention is the capability of the security system to lower the volume of the chirps. As shown in FIGS. 15 and 16, these chirps may either be "softened" at 1121 using transmitter 25 or programmed for softer operation during system operational function programming. As the pulse width of the power pulses is diminished, the power-output (volume) of the siren is likewise diminished. This is shown in FIG. 14A where the reduction is set at 90% (a 10% duty cycle).

Figure 14:
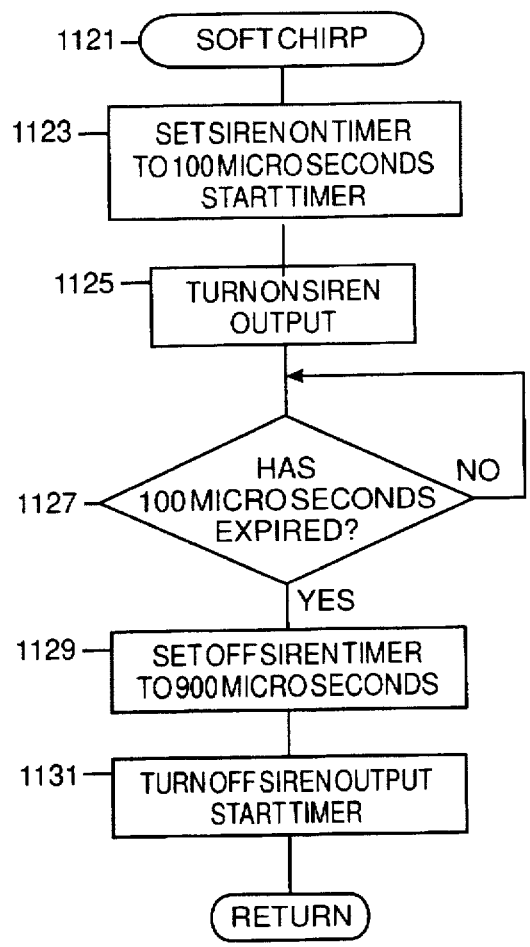

In FIG. 14, a 100-microsecond timer is started at 1123, the siren output is turned on at 1125, and the program enters a loop until the 100 microseconds have expired at 1127. When the 100 microseconds expire, the siren-off timer is set to 900 microseconds at 1129 and the siren is turned off at 1131, before controller 35 returns to the main program.

In FIG. 16, when the siren-off timer decrements to zero an interrupt is generated at 1135, the main chirp timer is decremented at 1137, and checked for a value of zero at 1139. If the timer is at zero, controller 35 returns to the main program, but if it is not at zero, the soft chirp 1121 continues.

Another means of softening the chirps is shown in FIGS. 2B and 2C where the output transistor base drive current is reduced thereby providing a lower output voltage to the security system siren. This latter method may be accomplished in two ways: the output of controller 35 may be pulsed during chirping to a holding capacitor, thereby reducing the output transistor drive current (FIG. 2B), or a separate controller output may be used to drive the siren output transistor (FIG. 2C).

Another novel method for indicating the threat level of an incoming threat to an electronically secured structure, such as a vehicle, comprises the steps of using a sensor means for sensing a threat delivered to the vehicle, generating an electric signal the strength of which is proportional to the intensity of the threat, ignoring the first portion of the signal so as to remove from further consideration those shocks that are non-physical or non-threatening, analyzing the remaining signal to determine if it is of a low, generally non-threatening intensity or a higher, generally security-threatening intensity, and producing either a first pulse that triggers a low intensity "warn away" alarm, or separate first and second pulses, representing a signal containing both the low intensity and higher intensity components, that triggers both warnaway and full alarms. The step of generating an electric signal includes generating an alternating current signal whose amplitude and period is proportional to the intensity of the physical shock. This invention is disclosed in detail in the patent application Ser. No. 07/886,871 entitled "METHOD OF INDICATING THE THREAT LEVEL OF AN INCOMING SHOCK TO AN ELECTRONICALLY SECURED VEHICLE AND APPARATUS THEREFOR" which was abandoned in favor of a Continuation In Part application Ser. No. 08/112,940 entitled "METHOD OF INDICATING THE THREAT LEVEL OF AN INCOMING SHOCK TO AN ELECTRONICALLY SECURED VEHICLE AND APPARATUS THEREFOR," now U.S. Pat. No. 5,432,670, and subsequent continuation or continuation in part applications continuing therefrom.

These applications and the U.S. Pat. No. 5,432,670 describe in detail a novel method and structure for using sensors to detect incoming threat and outputting an electrical signal proportional to the threat received. The above applications and the U.S. Pat. No. 5,432,670 are fully incorporated herein by reference. In the scope of the present application, the secured area is not limited to a vehicle, but is intended for protection of any area or device. Further, any sensor device and/or combination of sensors capable of generating an electrical signal proportional to the threat sensed by the sensor can be employed.

In the application of a single sensor, the sensor output is converted to a unique, assigned pulsewidth. Where the alarm system employs multiple alarm levels, multiple pulsewidths are assigned to the sensor to correspond to a minimum threat level and/or to a full threat level. For example, a pulse pulse having a 200 ms pulsewidth would generate a warnaway alert whereas a 1 second pulsewidth would generate a full alarm.

In the application where multiple sensors are arranged about a protected area, each sensor is assigned a unique pulsewidth range or parameter of time. One sensor may be assigned a pulsewidths of 200 ms and 1 second, second sensor assigned a pulsewidth range from 400 ms and 1.5 seconds, etc. Therefore, if the second sensor received a security threat, the sensor would generate a pulse with a 400 ms pulsewidth if the threat was minor and two simultaneous pulses of 400 ms and 1.5 seconds if the level of threat was significant thereby activating a full alarm. In sum, it is possible to place a plurality of sensors about a protected area for sensing incoming threat to a protected area where each sensor generates as its output a pulse having a unique, assigned pulsewidth for identification of the sensor and for interpretation the level of security threat sensed by the sensor.

FIG. 3, of the U.S. Pat. No. 5,534,845 is shown in this application as FIG. 17 and referred to for the purpose of identifying and the pertinent parts and functions of the invention. This figure discloses a circuit for accepting a signal from a sensor 12 and providing a pulse having a pulsewidth indicative of the level of threat received by the sensor 12 at the output 85. Referring to FIG. 3 of the U.S. Pat. No. 5,432,670, the front end of the signal is removed from consideration to avoid false alarms, integrated and translated or converted to a digital pulse by pulse generators 41 and 43. The pulsewidth of the pulse is indicative of the threat level received by the sensor 12. Because pulse generators 41 and 43 can be set for generation of different pulsewidths, each sensor in the array of sensors protecting an area, is assigned a unique pulsewidth set. Within this range, one pulse generator 41 will output a pulse having shorter pulsewidth corresponding with a low threat level and the other pulse generator 43 will generate a pulse having a longer pulsewidth corresponding with a high threat level. Moreover, this method and structure may be extrapolated to a number of pulsewidths defined by the threat level sensed by a sensor. Additional pulses would be provided by duplicating the pulse generator circuits shown in FIG. 3.

Figure 17:
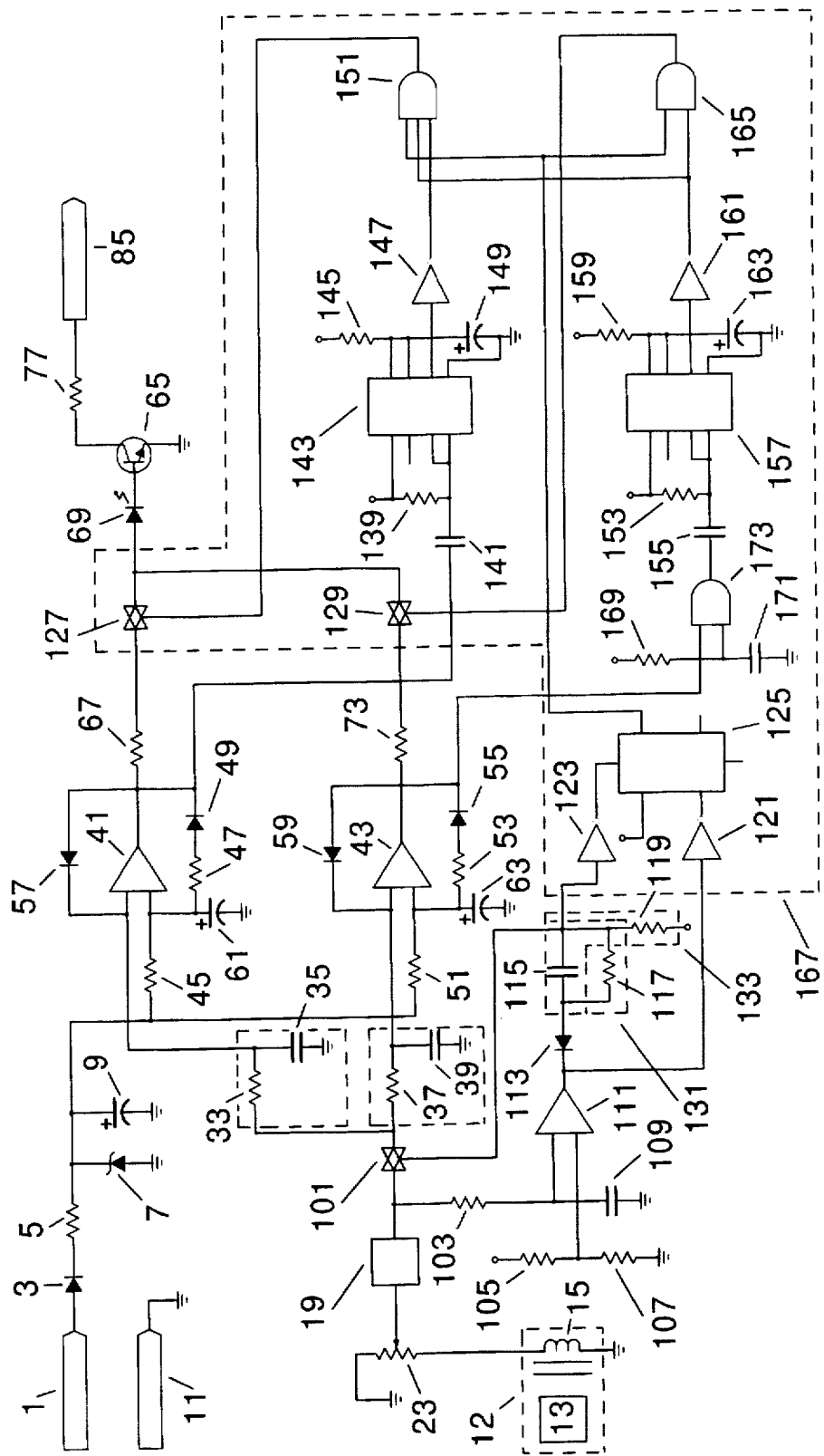

The circuit shown in FIG. 17 is duplicated for each sensor in the array of sensors protecting the secured area. Output 85, of FIG. 17, is a single wire and ground reference for all sensor circuits. In a conventional alarm system, each sensor 12 is connected to the alarm system with at least one physical wire and a ground reference. Therefore, in a system having 10 sensors, there are at least 10 wires. In the preferred embodiment, the system has a common reference, therefore a minimum of only one wire from all sensor circuits is required.

To provide for means for identifying each sensor 12 producing a pulse, each sensor is assigned a pulsewidth set. For example, a shock sensor is assigned 200 ms and 1 second pulsewidths. Therefore, a low level, warnaway alarm may be assigned a 200 millisecond pulse and a full threat may be assigned a one second pulse. Other sensors in the array are assigned different pulsewidth in a similar fashion. In the event a sensor receives a significant threat, two pulses are generated. One indicates a low level of intrusion and the second a high level of intrusion. The two pulses differ in pulsewidths which are assigned to them. In the preferred embodiment, the low level of alarm pulse has a shorter pulsewidth than the full alarm pulse. These pulses are transmitted to controller 35 either sequentially in tandem or simultaneously. Controller 35 measures the pulsewidth of the pulses with a counter which is either external or integral to the controller. The counter measures the pulsewidth and transmits the measurement to controller 35. Controller 35 compares the pulsewidth to determine if the signal is a transient, a malfunctioning component, a low level warnaway or a full alarm. Controller is able to make these determinations based on a look-up tables having the specific pulsewidths assigned to each sensor. Controller is able to make the determination of whether the pulsewidth is a transient and should be disregarded from consideration by comparing the pulsewidth to a minimum acceptable pulsewidth which is specified by the manufacturer. This is designed to avoid false alarms caused by transient signals caused by the environment or contemporaneous, adjacent electrical systems. Further, a malfunctioning component may activate a continuous pulse therefore initiating a lengthy false alarm. This is eliminated by disregarding and rejecting from consideration a pulse having a pulsewidth greater then a maximum pulsewidth parameter set by the manufacturer.

All pulses are brought to and coupled to a common output 85 and connected to system controller 35 by a single wire or a single electrical path, wherein Controller 35 measures the pulsewidth of the incoming pulse, determines what alarm level corresponds to the pulse received, identifies the sensor 12 generating the alarm and stores/catalogs the occurrence or the event of activation in a memory accessible to the controller. The combination of all signals on a single wire, also called and referred herein as multiplexing, allows for improved reliability, reduced cost and reduced complexity within an alarm system. Additionally, troubleshooting is simplified because there is only one wire to test for all sensors.

There are two ways to measure the pulsewidth of an incoming pulse from 85. First, the controller 35 may use an internal state interrupt and an internal counter to sense an incoming pulse and measure the pulsewidth of the same. In the alternative, the sensor input is checked at a predetermined time interval. In the preferred embodiment, the sensor input line is checked every two milliseconds. Once a pulse is detected, it is measured by the controller 35 internal timer, processed and acted upon as described above.

One of the benefits of this system is the ability to identify the sensor sending an alarm condition by the pulsewidth of the pulse. The source of the alarm is identifiable by measuring the pulsewidth of an incoming pulse with the counter embedded within or integral to controller 35 (or a counter chip built into the alarm system). Upon measurement of the pulsewidth, controller 35 is able to identify the sensor which is assigned the particular pulsewidth set. Each time the sensor produces an alarm condition, the event is stored/catalogued within a controller memory to provide a history report of sensor activation for subsequent retrieval by an operator. After a period of time, an operator may withdraw this data to determine the vulnerability of a particular area or to determine if a certain sensor is malfunctioning.

Another feature of this invention is the ability for controller 35 to disregard pulses having pulsewidths outside a user or manufacturer specified parameter or range of time. For example, where the shortest pulsewidth in an array of sensors 12 is 100 ms, a minimum range value programmed for acceptance is 50 ms and the counter measures a pulsewidth less than 50 ms, controller 35 will not sound an alarm. Instead, when controller 35 receives a pulse having a pulsewidth less then 50 ms, it will reject and disregard the signal as a transient. This provides for a way to reduce false alarms caused by transient events.

In a similar fashion, controller 35 will disregard a pulsewidths longer then a user predetermined number. This allows the alarm system to disregard and reject signals sent by malfunctioning components. In absence of such a feature, a malfunctioning sensor producing a continuous pulse or a pulse outside of its unique, assigned value will cause false alarms.

This invention provides for a method of multiplexing multiple outputs from sensors over a single wire. The method includes arranging a plurality of sensors 12 about a protected area and sensing incoming threat to the area. If a threat is received by a sensor or a group of sensors, sensors generate an electrical signal proportional to a threat received. Next, the electrical signals are converted to corresponding pulses, each pulse having a different pulsewidth with a set of pulsewidths assigned to each sensor. By assigning at least two pulsewidths to each sensor 12, each sensor 12 can generate a low level warnaway signal or a full alarm signal by generating a specific pulse and pulsewidth depending on whether the threat level is minimal or significant. Next step in the process is connecting all the sensor 12 outputs to a single common output 85 and connecting this common output 85 to controller 35 input by a single wire. Next step in the process is to send/transmit the pulses to an alarm controller 35 for receipt of the pulses and for sounding an alert on a combination of audio or visual transducer such as a siren or lights. A counter, either integral to or external to controller 35 measures the pulsewidth of an incoming pulse and identifies the sensor generating the alarm and identifies the degree or severity of the threat by the pulsewidth of the pulse. After measuring the pulsewidth of incoming pulse or pulses, the sensor is identified and is stored/catalogued in a memory accessible to controller 35 for a subsequent report for use as a troubleshooting tool. If a pulsewidth is outside a parameter set by the manufacturer or user, the pulse is rejected by the alarm controller as a transient or as a malfunctioning component. Thus, false alarms are curtailed and are not caused by transient electrical transients. Equally important, the alarm is not continuously activated when a sensor is malfunctioning. These events are stored/catalogued for subsequent retrieval by the user or the operator to determine if the system has experienced a malfunction or is vulnerable to threat at a particular location.

What is claimed is:

1. A security system for monitoring a protected area and sounding an alarm comprising:

at least one sensor arranged about a protected area for sensing incoming threat;

at least one pulse generator for generating at least one pulse for said sensor activated by said incoming threat to said area;

an alarm controller for receipt of said pulses and sounding of an alert;

a single wire connecting output of said pulse generator to said controller for transmission of said pulses to said controller;

a counter for measuring said pulsewidth of each said pulse;

said pulse generator generating a first pulse in response to a low level of threat and a second pulse in response to a high level of threat, each said pulse having a different assigned pulsewidth, wherein only said first pulse is generated for communication of said low level of threat received by said sensor, and said first and second pulses are generated for communication of said high level of threat received by said sensor.

2. The device of claim 1 wherein said pulses are generated and transmitted simultaneously.

3. The device of claim 1 wherein said pulses are generated sequentially.

4. The device of claim 1 wherein said pulse generator generates said first pulse in response to said low level of threat and said second pulse in response to said high level of threat, each said pulse having a different assigned pulsewidth for each said sensor, wherein only said first pulse is generated for communication of said low level of threat received by said sensor, and said second pulse is generated for communication of said high level of threat received by said sensor.

5. A security system for monitoring a protected area and sounding an alarm comprising:

at least one sensor arranged about a protected area;

said sensor sensing incoming threat to said protected area for generation of at least one electrical signal proportional to said incoming threat;

a pulse generator producing a single pulse in response to a low level of threat and at least two pulses in response to a high level of threat, each said pulse having a different assigned pulsewidth for each said sensor, wherein only said first pulse is generated for communication of said low level of threat received by said sensor, and said first and second pulse are generated for communication of said high level of threat received by said sensor;

a common output for coupling said pulses; and, a single wire connecting said common output and said controller for transmission of said pulses to said controller.

6. The device of claim 5 wherein said pulses are simultaneously generated in response to said high level of threat.

7. The device of claim 5 further including a counter for measuring said pulsewidth of each said pulse, for identifying said sensor by its assigned pulsewidth and for storing the activation of said sensor within a controller memory for a subsequent report to an operator.

8. The device of claim 5 wherein said counter is integral to said controller.

9. The device of claim 5 further including a plurality of sensors arranged about said area for sensing of said incoming threat to said area.

10. A method of multiplexing the output of multiple sensors over a single wire comprising the steps of:

arranging at least one sensor about a protected area;

said sensor sensing incoming threat to said protected area and generating at least one electrical signal proportional to said incoming threat;

converting said electrical signal to a single pulse in response to a low level of threat and at least two pulses in response to a high level of threat, each said pulse having a different assigned pulsewidth for each said sensor, wherein only said first pulse is generated for communication of said low level of threat received by said sensor, and said first and second pulse are generated for communication of said high level of threat received by said sensor;

coupling said pulses to a common output; and, transmitting said pulses to said controller on a single wire connecting said common output and said controller for receipt of said pulses and sounding of an alert.

11. The method of claim 10 wherein said step of converting said signals to corresponding pulses includes a step of producing a pulse having an assigned pulsewidth for each said sensor.

12. The method of claim 10 including additional steps of measuring said pulsewidth with said counter, identifying said sensor by its assigned pulsewidth and storing an event of activation of said sensor in a controller memory.

13. The method of claim 10 wherein the step of sounding an alert includes the step of activating a combination of audio and visual transducers.

14. The method of claim 10 further including a plurality of sensors arranged about said area for sensing of said incoming threat to said area.

15. A method of multiplexing the output of multiple sensors over a single wire comprising the steps of:

arranging at least one sensor about a protected area;

said sensor sensing incoming threat to said protected area and generating at least one electrical signal proportional to said incoming threat;

converting said electrical signal to a single pulse in response to a low level of threat and at least two pulses in response to a high level of threat, each said pulse having a different assigned pulsewidth for each said sensor, wherein only said first pulse is generated for communication of said low level of threat received by said sensor, and said first and second pulse are generated for communication of said high level of threat received by said sensor;

coupling said pulses to a common output;

transmitting said pulses to said controller on a single wire connecting said common output and said controller for receipt of said pulses and sounding of an alert;

measuring said pulsewidth of each said pulse with a counter embedded within said controller for identification of said sensor by its unique pulsewidth and cataloging the activation of said sensor within controller memory for a subsequent report;

identifying said sensor by its assigned pulsewidth; and, storing an event of activation of said sensor in a controller memory.

16. The method of claim 15 further including the step of rejecting a pulse having a pulsewidth outside a specified time parameter.

17. The method of claim 15 further including the step of rejecting transient signals indicated by a pulse having a pulsewidth less than a minimum specified time parameter.

18. The method of claim 15 further including the step of rejecting signals caused by a failed component indicated by a pulse having a pulsewidth greater than a maximum specified time parameter.

19. The method of claim 15 further including a plurality of sensors arranged about said area sensing said incoming threat to said area.

20. A method for monitoring a protected area and sounding an alarm comprising:

arranging at least one sensor about a protected area for sensing incoming threat;

generating a first pulse in response to a low level of threat and generating a second pulse in response to a high level of threat, each said pulse having a different assigned pulsewidth, wherein said first pulse is generated for communication of said low level of threat received by said sensor, and said second pulse is generated for communication of said high level of threat received by said sensor;

connecting outputs of said sensor to a controller with a single wire for transmitting said pulses generated by said sensor to said controller and sounding an alert; and measuring said pulsewidth of each said pulse with a counter.

21. The method of claim 20 further including the step of generating said first pulse in response to said low level of threat and generating said second pulse in response to said high level of threat, each said pulse having a different assigned pulsewidth for each said sensor, wherein only said first pulse is generated for communication of said low level of threat received by said sensor, and said second pulse are generated for communication of said high level of threat received by said sensor.

22. The method of claim 20 further including the step of generating said first pulse in response to said low level of threat and generating at least two pulses in response to said high level of threat, each said pulse having a different assigned pulsewidth for each said sensor, wherein only said first pulse is generated for communication of said low level of threat received by said sensor, and said first and second pulse are generated for communication of said high level of threat received by said sensor.

23. The method of claim 22 wherein said pulses are generated and transmitted to said controller simultaneously over said single wire.

24. The method of claim 22 wherein said pulses are generated and transmitted to said controller sequentially over said single wire.

* * * * *